US007147296B2

(12) United States Patent
Kakutani

(10) Patent No.: US 7,147,296 B2
(45) Date of Patent: Dec. 12, 2006

(54) EJECTION CONTROL OF QUALITY-ENHANCING INK

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 10/884,384

(22) Filed: Jul. 2, 2004

(65) Prior Publication Data

US 2005/0057594 A1 Mar. 17, 2005

(30) Foreign Application Priority Data

Jul. 8, 2003 (JP) ............................. 2003-193266
Jul. 8, 2003 (JP) ............................. 2003-193270

(51) Int. Cl.
*B41J 2/205* (2006.01)
*G06K 1/00* (2006.01)

(52) U.S. Cl. .......................................... 347/15; 358/1.9

(58) Field of Classification Search .................. 347/15, 347/43, 98; 358/1.9, 3.09, 3.06, 3.23, 1.2
See application file for complete search history.

(56) References Cited

U.S. PATENT DOCUMENTS 5,933,164 A * 8/1999 Sato et al. .................... 347/43
6,158,834 A * 12/2000 Kato et al. ..................... 347/9
6,474,778 B1 * 11/2002 Koitabashi et al. ........... 347/43

FOREIGN PATENT DOCUMENTS

JP 2002-144551 5/2002

OTHER PUBLICATIONS

Abstract of Japanese Patent Publication No. 2002-144551, Pub. Date: May 2002, Patent Abstracts of Japan.

* cited by examiner

*Primary Examiner*—Lamson Nguyen
(74) *Attorney, Agent, or Firm*—Martine Penilla & Gencarella, LLP

(57) ABSTRACT

This invention is a printing method of forming dots on a print medium by ejecting a colored ink and a quality-enhancing ink. This method generates dot data representing a state of dot formation of the color dot and the transparent dot at each pixel based on the color dot recording rate table and the transparent dot recording rate table. The transparent dot recording rate table is configured to require a less process load for generation of the dot data than the color dot recording rate table.

18 Claims, 23 Drawing Sheets

High Mean Flight Speed

Appearance of Banding due to Positional Deviation of Dot formation
Fig.12(a) Dot Recording Rate (Small 100%)
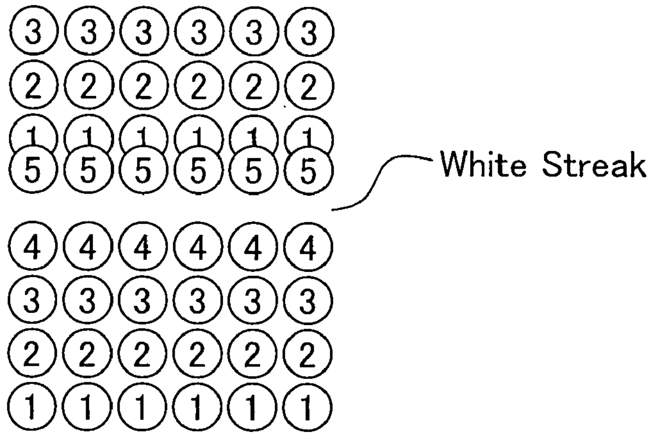
Fig.12(b) Dot Recording Rate (Small 40%)
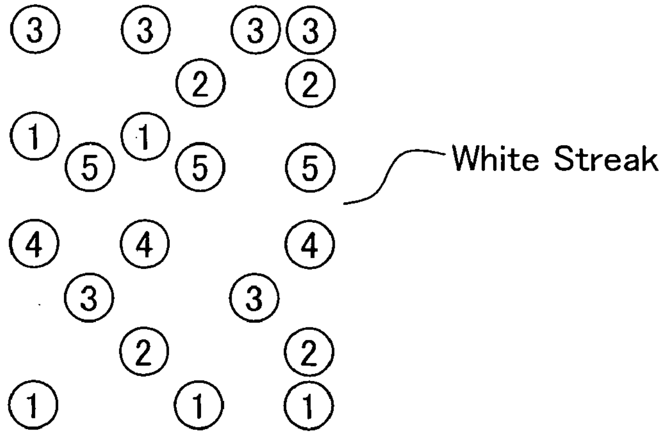
Fig.12(c) Dot Recording Rate (Small 30%, Medium 5%)
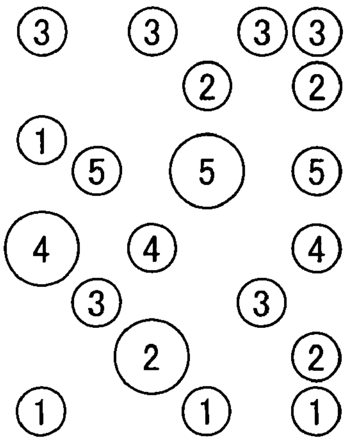

Another Example of Transparent Dot Recording Rate Table

THIRD EMBODIMENT

Color Dot Recording Rate Table

Transparent Dot Recording Rate Table

FOURTH EMBODIMENT

FIFTH EMBODIMENT

EJECTION CONTROL OF QUALITY-ENHANCING INK

BACKGROUND OF THE INVENTION

1. Field of the Invention

The present invention relates to a printing technique of ejecting a plurality of inks on a printing medium to print an image.

2. Description of the Related Art

Color printers that eject multiple different color inks from a print head have widely been used as the output device of the computer to print computer-processed images in multiple colors and multiple tones. One applicable method for such tone expression selectively forms one among multiple variable-size dots in the area of one pixel on a printing medium.

This tone expression technique records the respective size dots at adequate recording rates to express the various tone values. The dot recording rates of the respective size dots are set in advance to enable adequate allocation of the respective size dots and thereby restrain the potential deterioration of the picture quality, for example, to lower the granularity (the roughness of the resulting image) and the visibility of banding (deterioration of the picture quality by the appearance of streaks).

A quality-enhancing ink for improving the quality of a printed material may be used in such printers as disclosed in, for example, Japanese Patent Laid-Open Gazette No. 2002-144551. The quality-enhancing ink improves the properties like color development, water resistance, and light stability and prevents a variation in gloss to attain the high quality of the printed materials. The quality-enhancing ink is practically transparent. Reduction of the processing time required for generation of the dot data is accordingly more important than reduction of the deterioration of picture quality by adequate allocation of the respective size dots.

The prior art technique, however, does not set the dot recording rate of the dot formed with the quality-enhancing ink from the perspective of reduction of the processing time required for generation of the dot data.

SUMMARY OF THE INVENTION

The object of the present invention is thus to eliminate the drawbacks of the prior art and to provide a technique of shortening a total processing time required for printing with a quality-enhancing ink, which is used to improve the quality of a printed material.

In order to attain the above and the other objects of the present invention, there is provided a printing control method of generating print data to be supplied to a print unit to print. The print unit forms dots on a print medium by ejecting ink droplets of at least one type of colored ink containing a color material and a quality-enhancing ink for enhancing quality of a printed material. The printing control method comprises: (a) selecting a color dot recording rate table storing a color dot recording rate representing a dot recording rate of a color dot formed with the colored ink for specifying the color dot recording rate, while selecting a transparent dot recording rate table storing a transparent dot recording rate representing a dot recording rate of a transparent dot formed with the quality-enhancing ink for specifying the transparent dot recording rate; and (b) generating dot data representing a state of dot formation of the color dot and the transparent dot at each pixel according to a pixel value of given image data based on the selected dot recording rate table. The transparent dot recording rate table is configured to require a less process load for generation of the dot data than the color dot recording rate table.

The print control method of the invention applies the transparent dot recording rate table, which is configured to require a less process load for generation of the dot data than the color dot recording rate table. This arrangement desirably relieves the potential increase in processing load due to the use of the quality-enhancing ink, thus shortening the total processing time required for printing.

In the above configuration, the printing unit comprises a print head having a plurality of nozzles and a plurality of ejection drive elements for ejecting ink drops from the plurality of nozzles, and is capable of selectively forming one of N types of dots having different sizes at one pixel area with each nozzle. The N is an integer of at least 2. The transparent dot recording rate table is configured to have a greater maximum dot recording rate of a specific dot than a maximum dot recording rate of the specific dot in the color dot recording rate table. The specific dot is at least one type of dot among the N types of dots.

In the above first configuration of this invention, the transparent dot recording rate table is configured to have a greater maximum dot recording rate of a specific dot than a maximum dot recording rate of the specific dot in the color dot recording rate table. This arrangement desirably reduces the number of tones expressed by mixture of multiple different types of dots. Application of this transparent dot recording rate table increases the number of tones having a greater variety of unused types of dots for the tone expression. The whole series of processing required for generation of the dot data is simplified with regard to the unused types of dots for the dot expression. The increase of unused types of dots for the tone expression thus desirably shortens the total processing time required for printing.

Here the terminology 'dot recording rate' represents a ratio of dot-on pixels to all the pixels included in a homogeneous area reproduced according to a fixed tone value. The 'printed material' means any printed material obtained by ejection of the colored inks and the quality-enhancing ink on the printing medium. The terminology 'quality-enhancing ink' means ink that improves the properties like color development, water resistance, and light stability and prevents a variation in gloss, so as to enhance the quality of the printed material. The 'transparent dot' means a dot formed with the quality-enhancing ink and may not be completely transparent.

In the above configuration, the printing unit comprises a print head having a plurality of nozzles and a plurality of ejection drive elements for ejecting ink drops from the plurality of nozzles, and is capable of selectively forming one of N types of dots having different sizes at one pixel area with each nozzle. The N is an integer of at least 2. The transparent dot recording rate table is configured to have a greater ratio of colors requiring formation of only a specific dot to all colors expressed by the pixel values of the given image data than the ratio in the color dot recording rate table, whereby reducing the process load for generation of the dot data. The specific dot is at least one type of dot among the N types of dots.

In the above second configuration, the transparent dot recording rate table has the greater ratio of colors requiring formation of only the specific dot, which represents one type of dot among the N types of dots, to all the colors expressed by the pixel values of the given image data than the equivalent ratio of the colors requiring formation of only the specific dot in the color dot recording rate table. Application of this transparent dot recording rate table to the setting of the transparent dot recording rate, thus increasing the unused types of dots for the tone expression and thereby desirably shortening the total processing time required for printing, like the transparent dot recording rate table of the first application.

In one preferable embodiment corresponding to the print control method of the invention, the dot data generator comprises a color conversion module and a tone-decreasing module. The color conversion module is configured to convert a pixel value of the given image data representing color of each pixel into tone values of respective inks to express the color of the pixel with at least part of the color inks and the quality-enhancing ink available in the printing module. The tone-decreasing module is configured to generate the dot data according to the tone values of the respective inks obtained in the color conversion process. The tone-decreasing module is also configured to determine the transparent dot recording rate according to the tone value of the quality-enhancing ink based on the selected transparent dot recording rate table, while determine the color dot recording rate according to the tone value of the color ink based on the selected color dot recording rate table. The transparent dot recording rate table is configured to require the reduced process load due to a greater ratio of a number of tones expressed by only the specific dot to a total number of tones than the ratio of the color dot recording rate table.

It is preferable that the specific dot is the smallest-size dot among the N types of dots.

The quality-enhancing ink is generally used at the highest repetition in a relatively low tone range expressed by only the smallest-size dot. This arrangement thus remarkably increases the rate of zero level data set in the tone-decreasing process of the quality-enhancing ink.

In another preferable embodiment corresponding to the print control method of the invention, the color conversion module is configured to convert a pixel value of the given image data representing color of each pixel into tone values of respective inks to express the color of the pixel with at least part of the color inks and the quality-enhancing ink available in the printing module. The tone-decreasing module is configured to generate the dot data according to the tone values of the respective inks obtained in the color conversion step. The tone-decreasing module determines no formation of at least one type of dot among the N types of dots when the tone value of the quality-enhancing ink is within a predetermined range, and determines a dot on-off state to express the tone value of the quality-enhancing ink with the other types of dots including the specific dot.

The dot on-off state of at least part of the multiple different types of dots is specified by simple comparison between the tone value and a predetermined threshold value. This further shortens the total processing time required for printing. The 'tone value of ink' is equivalent to the ejected quantity of ink per unit area.

In the above configuration, the printing unit comprises a print head having a plurality of nozzles and a plurality of ejection drive elements for ejecting ink drops from the plurality of nozzles, and is capable of selectively forming one of N types of dots having different sizes at one pixel area with each nozzle. The N is an integer of at least 2. The transparent dot recording rate table is configured to require the reduced process load due to fixing a dot recording rate of a specific dot to zero against all available pixel values. The specific dot is at least one type of dot among the N types of dots.

In the transparent dot recording rate table of the third application, the dot recording rate of the specific dot as at least one type of selected dot is fixed to zero against all the available pixel values. Namely the at least one type of dot is not used at all for the tone expression. The processing required for generation of the dot data is simplified with regard to the unused types of dots for the dot expression. The increase of unused types of dots for the tone expression thus desirably shortens the total processing time required for printing.

In the above configurations, the color conversion module converts a pixel value of the given image data representing color of each pixel into tone values of respective inks to express the color of the pixel with at least part of the color inks and the quality-enhancing ink available in the printing module. The tone-decreasing step generates the dot data according to the tone values of the respective inks obtained in the color conversion step. The tone-decreasing step determines no formation of the specific dot among the N types of dots without exception and specifies a dot on-off state of other types of dots but the specific dot among the N types of dots according to the tone value of the quality-enhancing ink.

This arrangement desirably omits the whole series of processing to determine the dot on-off state of at least part of the multiple different types of dots, thus further shortening the total processing time required for printing.

In the above configurations, the transparent dot recording rate table may be configured to require the reduced process load due to having a less number of tones stored corresponding to the transparent dot recording rate than a number of tones stored corresponding to the color dot recording rate in the color dot recording rate table.

This arrangement desirably saves the consumption of a cache memory, thus enhancing the hit rate of the cache memory and accelerating the tone-decreasing process. Reduction of the number of tones may be attained by storing the dot recording rate with regard to only part of the tone values or by increasing the quantization width.

In the above configurations, the transparent dot recording rate table includes multiple tables provided corresponding to different types of the printing medium. The table selection module 101 selects one of the multiple tables according to type of the printing medium.

The technique of the invention is thus applicable to the variety of printing media having different suitable quantities of ejection of the quality-enhancing ink.

In the above configurations, the transparent dot recording rate table includes multiple tables provided corresponding to different types of the quality-enhancing ink. The table selection module selects one of the multiple tables according to type of the quality-enhancing ink.

The technique of the invention is thus applicable to the variety of quality-enhancing inks having different suitable quantities of ejection of the quality-enhancing ink.

The technique of the invention is actualized by any of other diverse applications, which include printing devices, computer programs that cause the computer to attain the respective functions of the methods and the devices discussed above, recording media in which such computer programs are recorded, and data signals that include such computer programs and are embodied in carrier waves.

BRIEF DESCRIPTION OF THE DRAWINGS

FIGS. 12(*a*), 12(*b*), and 12(*c*) show the appearance of banding in relation to the dot recording rates of the small-size dot and the medium-size dot;

DESCRIPTION OF THE PREFERRED EMBODIMENTS

Figure 1:
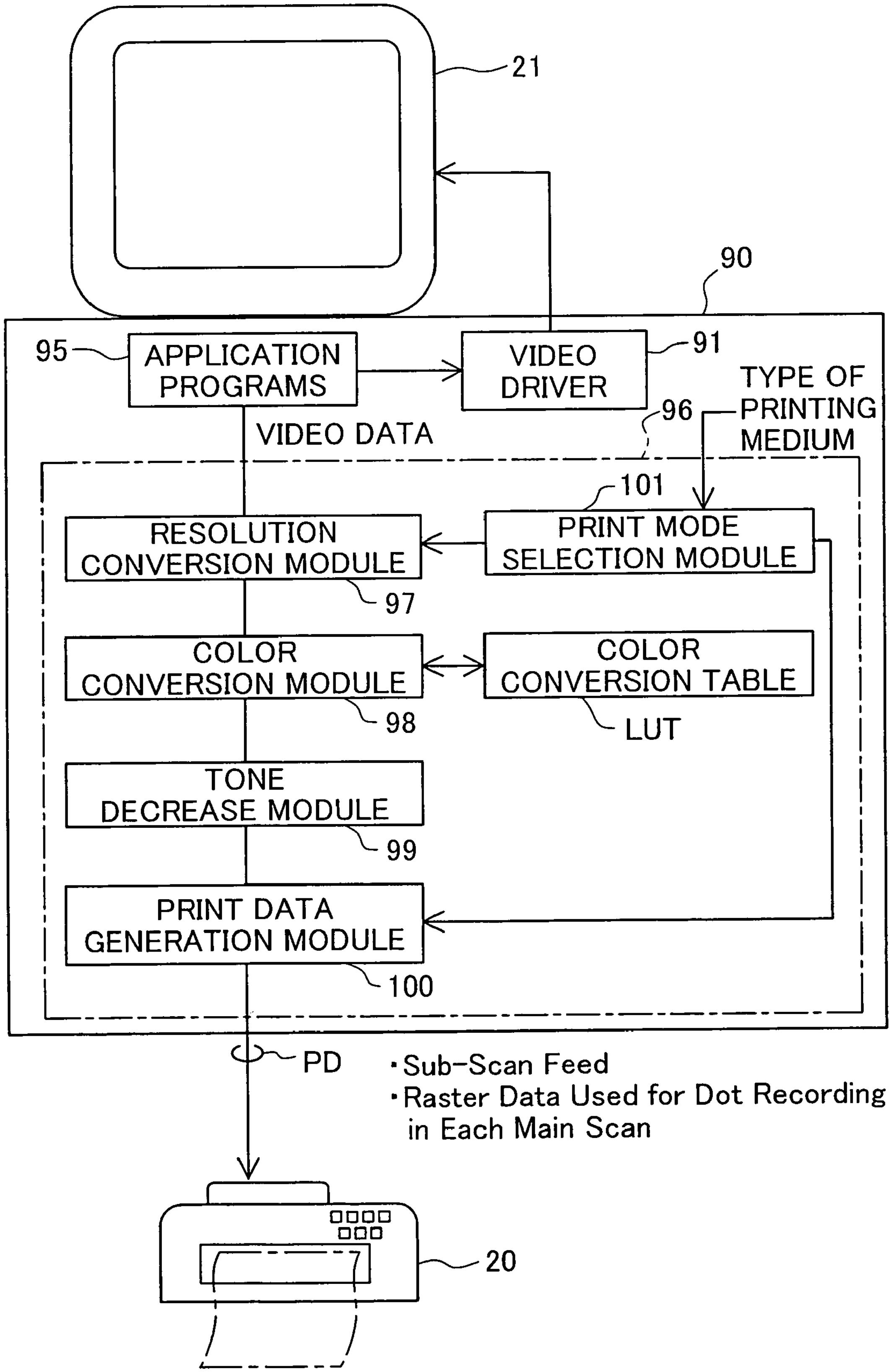
FIG. 1 is a block diagram showing the configuration of a printing system in one embodiment of the invention.

Some modes of carrying out the invention are discussed below as preferred embodiments in the following sequence:

A. Configuration of System
B. Print Data Generation Process of First Embodiment
C. Print Data Generation Process of Second Embodiment
D. Print Data Generation Process of Third Embodiment
E. Print Data Generation Process of Fourth Embodiment
F. Print Data Generation Process of Fifth Embodiment
G. Modifications A. Configuration of System FIG. 1 is a block diagram schematically illustrating the configuration of a printing system in one embodiment of the invention. This printing system includes a computer 90 functioning as a printing control apparatus and a color printer 20 functioning as a print unit. The combination of the color printer 20 with the computer 90 is regarded as a "printing apparatus" in the broad sense.

Application program 95 operates on computer 90 under a specific operating system. A video driver 91 and a printer driver 96 are incorporated in the operating system. The application program 95 outputs image data, which goes through a series of image processing in the printer driver 96 and is given as print data PD to the color printer 20. The application program 95 also outputs image data to display a processed image on a CRT 21 via the video driver 91.

The printer driver 96 includes a resolution conversion module 97, a color conversion module 98, a tone-decrease module 99, a print data generation module 100, multiple color conversion tables LUT, and a dot rate table DT. The functions of these constituents will be discussed later.

The printer driver 96 is equivalent to a program functioning to generate the print data PD. The program of attaining the functions of the printer driver 96 is supplied in the form recorded in a computer readable recording medium. Typical examples of such computer readable recording medium include flexible disks, CD-ROMs, magneto-optic disks, IC cards, ROM cartridges, punched cards, prints with barcodes or other codes printed thereon, internal storage devices (memories like RAM and ROM) and external storage devices of the computer, and a diversity of other computer readable media.

Figure 2:
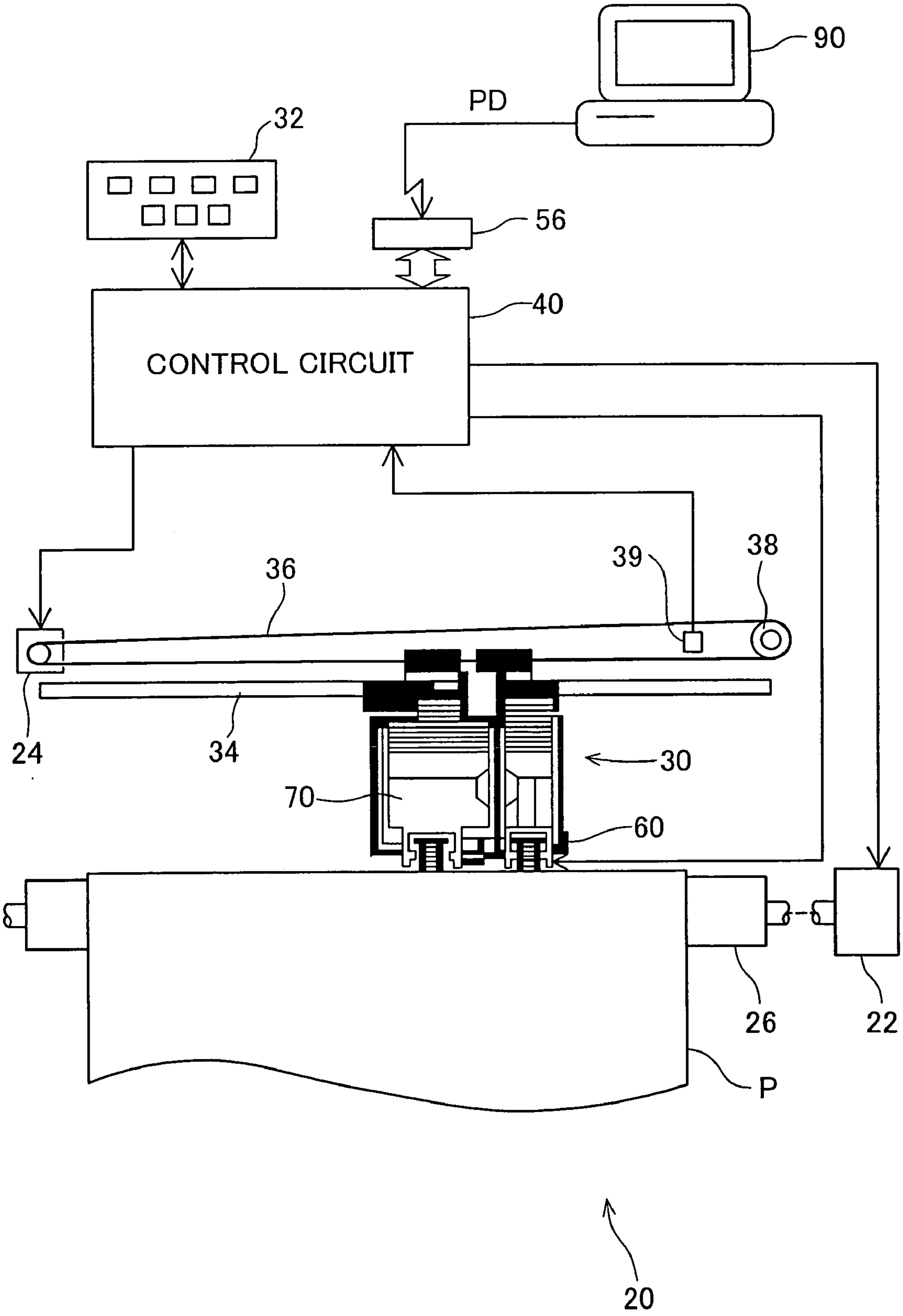
FIG. 2 schematically illustrates the structure of a color printer 20.

FIG. 2 schematically illustrates the structure of the color printer 20. The color printer 20 has a sub-scan drive unit that activates a paper feed motor 22 to feed a sheet of printing paper P in a sub-scanning direction, a main scan drive unit that activates a carriage motor 24 to move a carriage 30 back and forth in an axial direction of a paper feed roller 25 (in a main scanning direction), a head drive mechanism that drives a print head unit 60 (also called 'print head assembly') mounted on the carriage 30 to control ink ejection and dot formation, and a control circuit 40 that transmits signals to and from the paper feed motor 22, the carriage motor 24, the print head unit 60, and an operation panel 32. The control circuit 40 is connected to the computer 90 via a connector 56.

Figure 3:
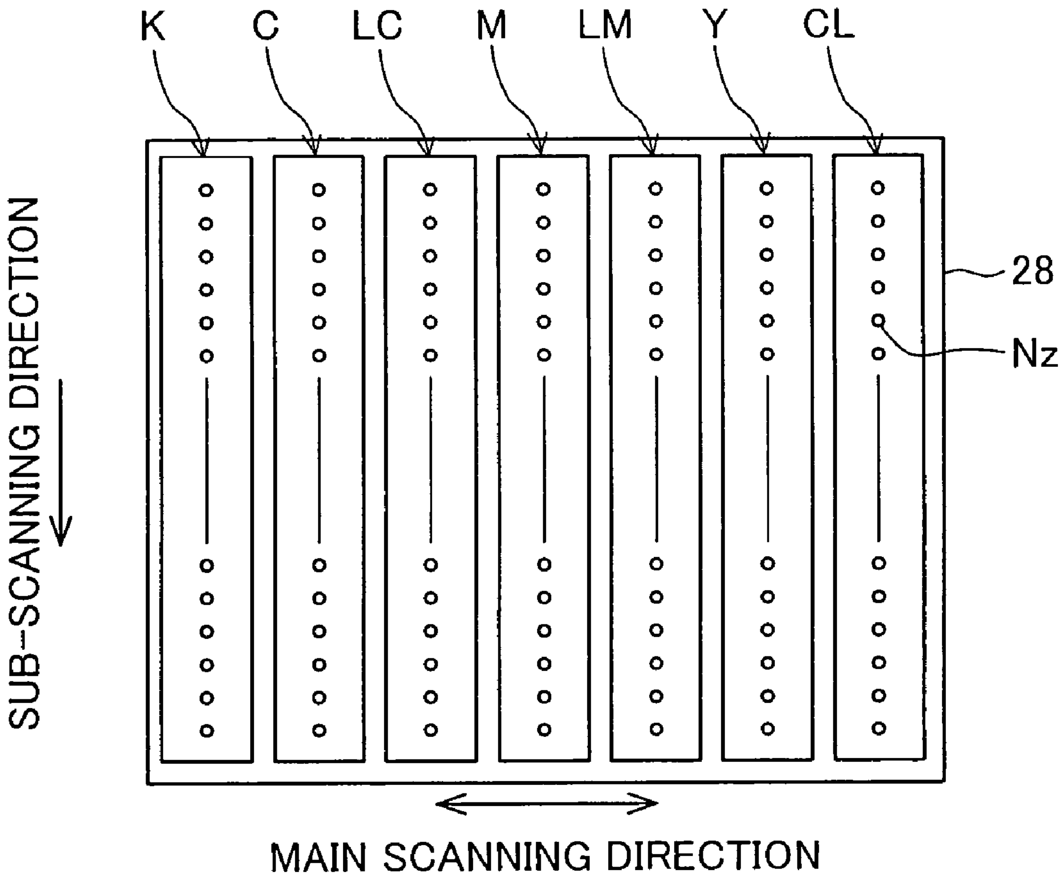
FIG. 3 shows an arrangement of nozzles on a bottom face of a print head 28.

FIG. 3 shows an arrangement of nozzles on a bottom face of a print head 28. Nozzle arrays for ejecting color inks containing color material and transparent quality-enhancing ink CL are formed on the bottom face of the print head 28. The structure of the embodiment uses black ink K, cyan ink C, light cyan ink LC, magenta ink M, light magenta ink LM, and yellow ink Y as the color inks.

The color inks are, however, not restricted to these six inks K, C, LC, M, LM, and Y, but may be specified arbitrarily according to the desired quality of printing images. For example, four inks K, C, M, and Y may be available. In another example, only black ink K may be used as the color ink. Dark yellow ink having lower lightness than that of the yellow ink Y, gray ink having higher lightness than that of the black ink K, blue ink, red ink, and green ink may be used additionally in any combination.

The quality-enhancing ink CL may be transparent and colorless ink that has the equivalent gloss to those of the other inks and improves the color development properties of the other inks. One typical example of the quality-enhancing ink CL is one of inks disclosed in Japanese Patent Laid-Open Gazette No. Hei 8-60059. The quality-enhancing ink restrains a variation in gloss and improves the color development properties, thus ensuring the high quality of printed images. Application of water resistance-enhancing and light stability-enhancing ink to the quality-enhancing ink CL effectively improves the water resistance and the light stability of printed images.

Each nozzle has a piezoelectric element as an ejection actuating element to actuate each nozzle for ejection of ink droplets as described later. In a printing process, ink droplets are ejected from respective nozzles, while the print head 28 shifts in a main scanning direction.

Figure 4:
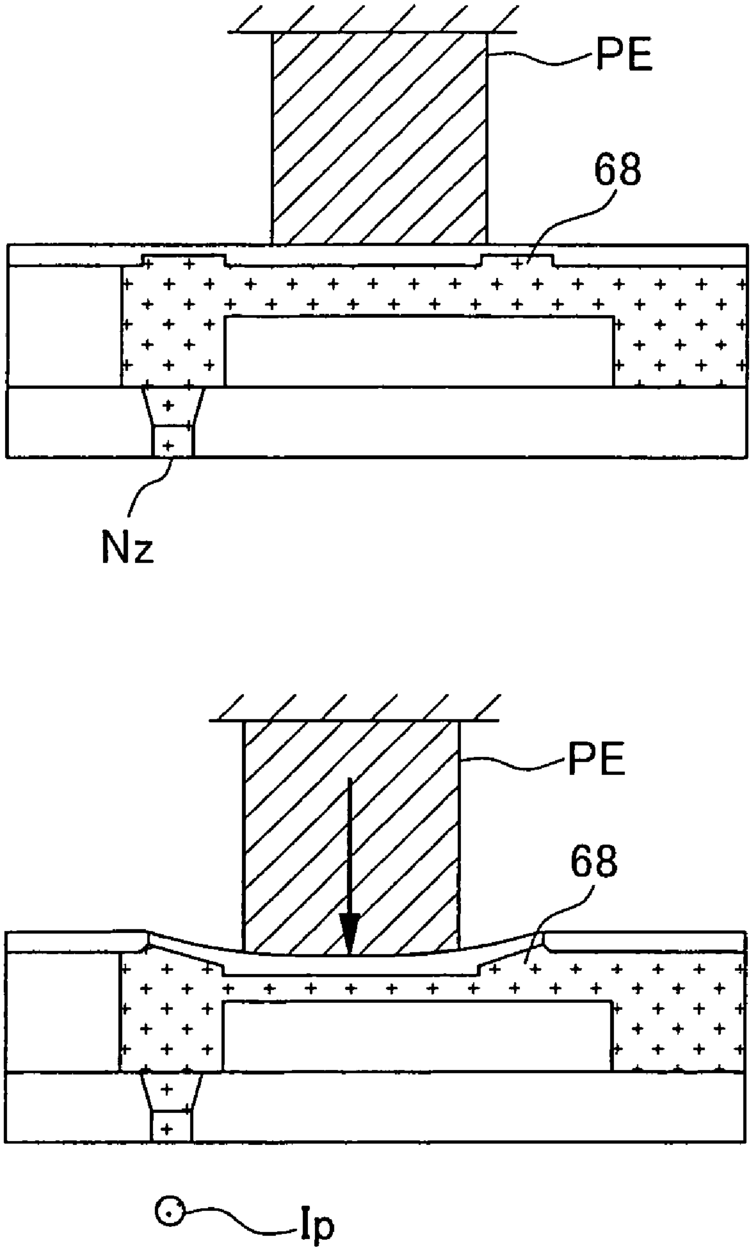
FIG. 4 shows the structure of a nozzle Nz and a piezo-electric element PE.

FIG. 4 shows the structure of a nozzle Nz and a piezoelectric element PE. The piezoelectric element PE is located at a position in contact with an ink passage 68 that leads the flow of ink to the nozzle Nz. In the structure of the embodiment, a voltage is applied between electrodes provided on both ends of the piezoelectric element PE to deform one side wall of the ink passage 68 and thereby attain high-speed ejection of an ink droplet Ip from the end of the nozzle Nz.

Figure 5A:
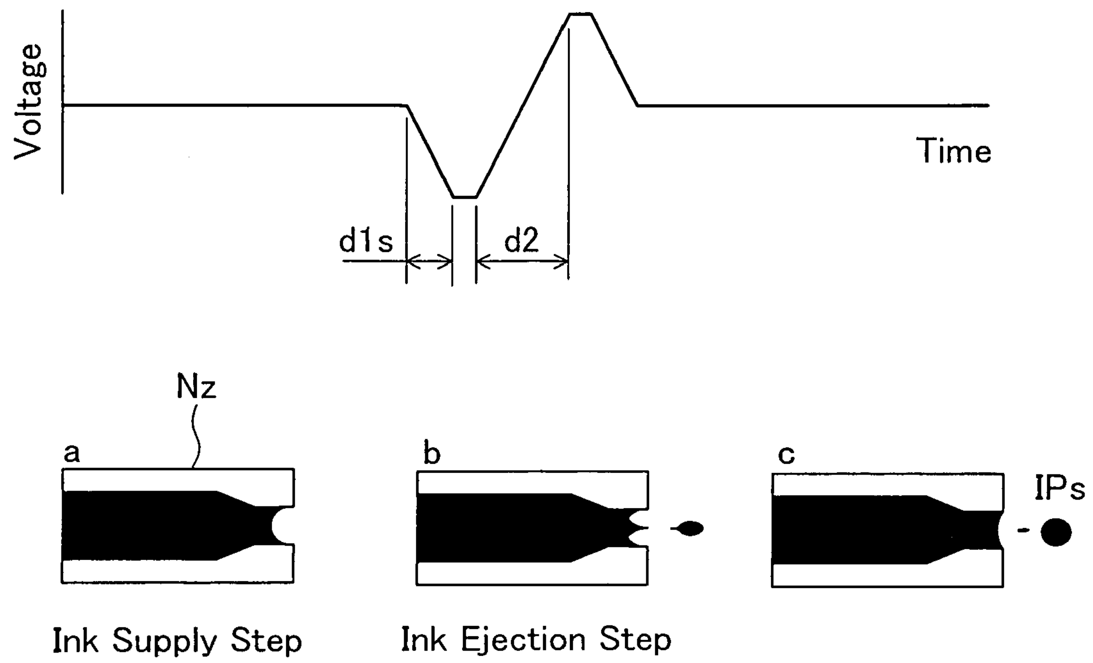
FIGS. 5(*a*) and 5(*b*) show two driving waveforms of the nozzle Nz for ink ejection and resulting small-size and medium-size ink droplets IPs and IPm ejected in response to the driving waveforms.
Figure 5B:
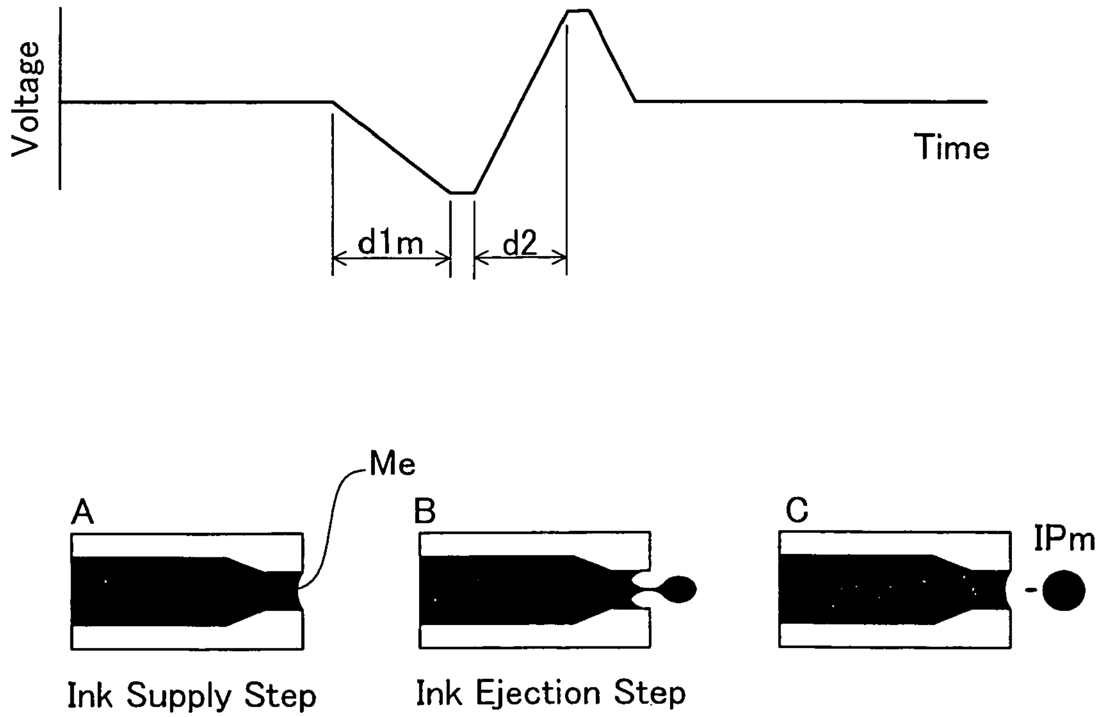

FIGS. 5(*a*) and 5(*b*) show two driving waveforms of the nozzle Nz for ink ejection and resulting small-size and medium-size ink droplets IPs and IPm ejected in response to the driving waveforms. FIG. 5(*a*) shows a driving waveform to eject a small-size ink droplet IPs that independently forms a small-size dot. FIG. 5(*b*) shows a driving waveform to eject a medium-size ink droplet IPm that independently forms a medium-size dot. The small-size dot and the medium-size dot of this embodiment correspond to the 'specific dot' in the claims of the invention.

The small-size ink droplet IPs is ejected from the nozzle Nz by two steps given below, that is, an ink supply step and an ink ejection step:

(1) Ink supply step (d1s): The ink passage 68 (see FIG. 4) is expanded at this step to receive a supply of ink from a non-illustrated ink tank. A decrease in potential applied to the piezoelectric element PE contracts the piezoelectric element PE and thereby expands the ink passage 68; and (2) Ink ejection step (d2): The ink passage 68 is compressed to eject ink from the nozzle Nz at this step. An increase in potential applied to the piezoelectric element PE expands the piezoelectric element PE and thereby compresses the ink passage 68.

The medium-size ink droplet IPm is formed by decreasing the potential applied to the piezoelectric element PE at a relatively low speed in the ink supply step as shown in FIG. 5(*b*). A relatively gentle slope of the decrease in potential slowly expands the ink passage 68 and thus enables a greater amount of ink to be fed from the non-illustrated ink tank.

The high decrease rate of the potential causes an ink interface Me to be pressed significantly inward the nozzle Nz, prior to the ink ejection step as shown in FIG. 5(*a*). This reduces the size of the ejected ink droplet. The low decrease rate of the potential, on the other hand, causes the ink interface Me to be pressed only slightly inward the nozzle Nz, prior to the ink ejection step as shown in FIG. 5(*b*). This increases the size of the ejected ink droplet. The procedure of this embodiment varies the size of the ejected ink droplet by varying the rate of change in potential in the ink supply step.

Figure 6:
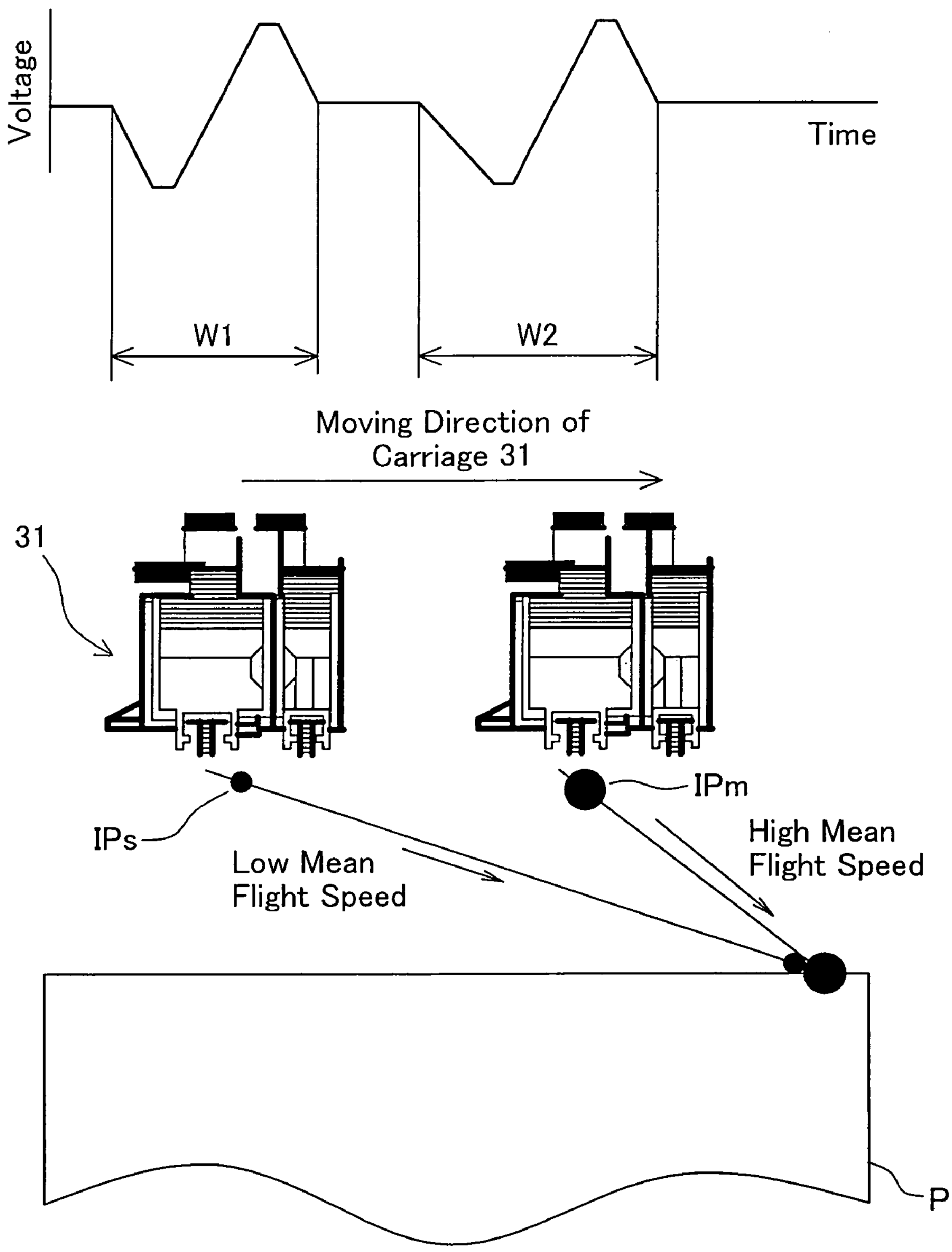
FIG. 6 shows a process of using the small-size and medium-size ink droplets IPs and IPm to form three variable-size dots, that is, large-size, medium-size, and small-size dots, at an identical position.

FIG. 6 shows a process of using the small-size and medium-size ink droplets IPs and IPm to form three variable-size dots, that is, large-size, medium-size, and small-size dots, at an identical position. A driving waveform W1 is output to eject the small-size ink droplet IPs, and a driving waveform W2 is output to eject the medium-size ink droplet IPm. As clearly understood from FIG. 6, in the structure of this embodiment, the driving waveform W2 for ejection of the medium-size ink droplet IPm is output after a predetermined time period elapsed since output of the driving waveform W1 for ejection of the small-size ink droplet IPs.

The two driving waveforms W1 and W2 are output to the piezoelectric element PE at these timings, so that the medium-size ink droplet IPm reaches the same hitting position as the hitting position of the small-size ink droplet IPs. As clearly shown in FIG. 6, ejection of the medium-size ink droplet IPm having a relatively high mean flight speed after the predetermined time period elapsed since ejection of the small-size ink droplet IPs having a relatively low mean flight speed enables the two variable-size ink droplets IPs and IPm to reach at substantially the same hitting positions. The mean flight speed represents the average value of flight speed from ejection to hitting against printing paper and decreases with an increase in speed reduction rate.

The color printer 20 having the hardware configuration described above actuates the piezoelectric elements of the print head 28, simultaneously with a feed of printing paper P by means of the paper feed motor 22 and reciprocating movements of the carriage 30 by means of the carriage motor 24. Ink droplets of respective colors are thus ejected to form large-size, medium-size, and small-size ink dots and form a multi-color, multi-tone image on the printing paper P.

B. Print Data Generation Process in First Embodiment

Figure 7:
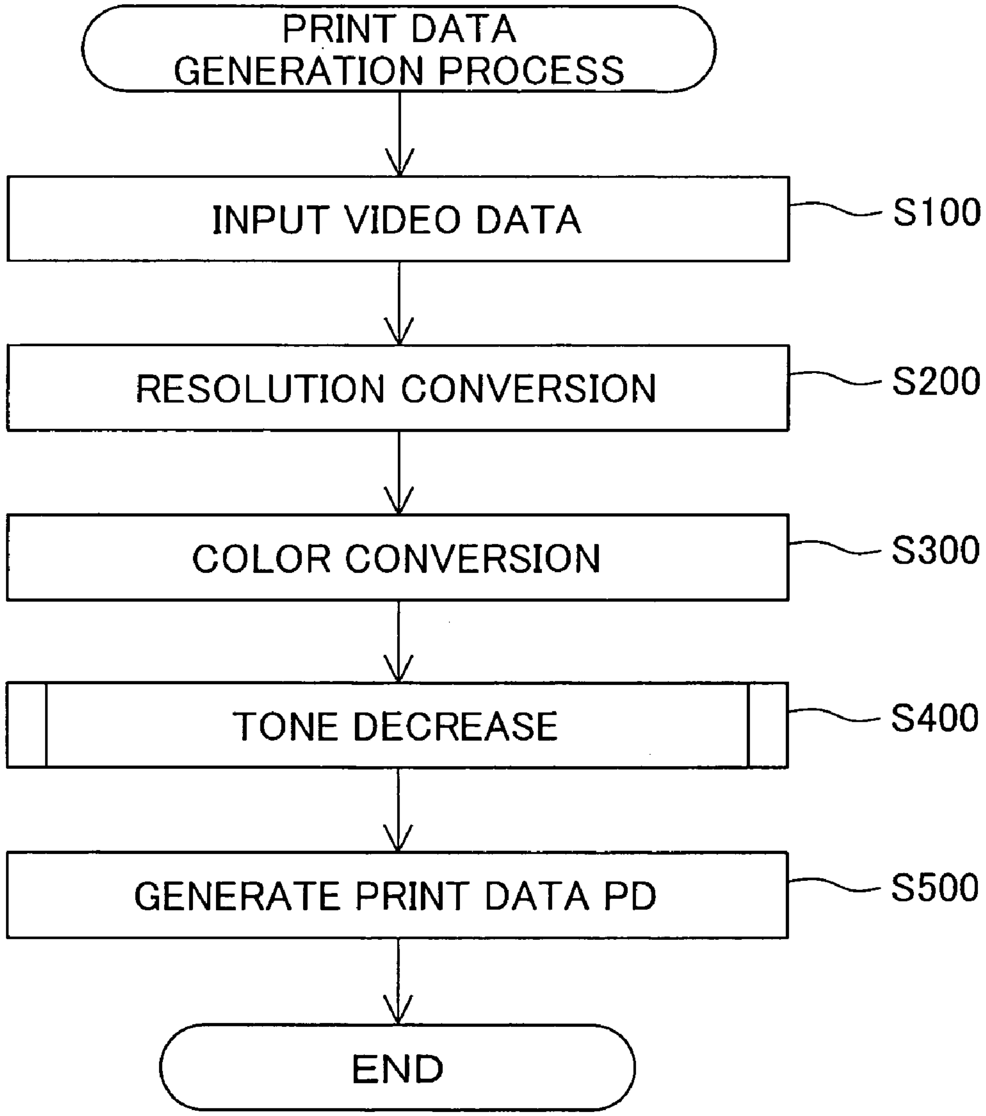
FIG. 7 is a flowchart showing a routine of print data generation process executed in a first embodiment.

FIG. 7 is a flowchart showing a routine of print data generation process executed in the first embodiment. The print data generation process is executed by the computer 90 to generate print data PD, which is to be supplied to the color printer 20.

At step S100, the printer driver 96 (FIG. 1) inputs image data from the application programs 95. The input of the image data is triggered by a printing instruction given by the application programs 95. Here the image data are RGB data.

At step S200, the resolution conversion module 97 converts the resolution (that is, the number of pixels per unit length) of the input RGB image data into a predetermined resolution.

At step S300, the color conversion module 98 refers to the color conversion table LUT (FIG. 1) and converts the RGB image data into multi-tone data of the color inks and the quality-enhancing ink available in the color printer 20 with regard to the respective pixels.

At subsequent step S400, the tone-decreasing module 99 carries out a tone-decreasing process. The tone-decreasing process reduces the 256 tones of the multi-tone data to 4 tones expressible in each pixel by the color printer 20. In this embodiment, the 4 expressible tones are states of 'no formation of dot', 'formation of a small-size dot', 'formation of a medium-size dot', and 'formation of a large-size dot'.

Figure 8:
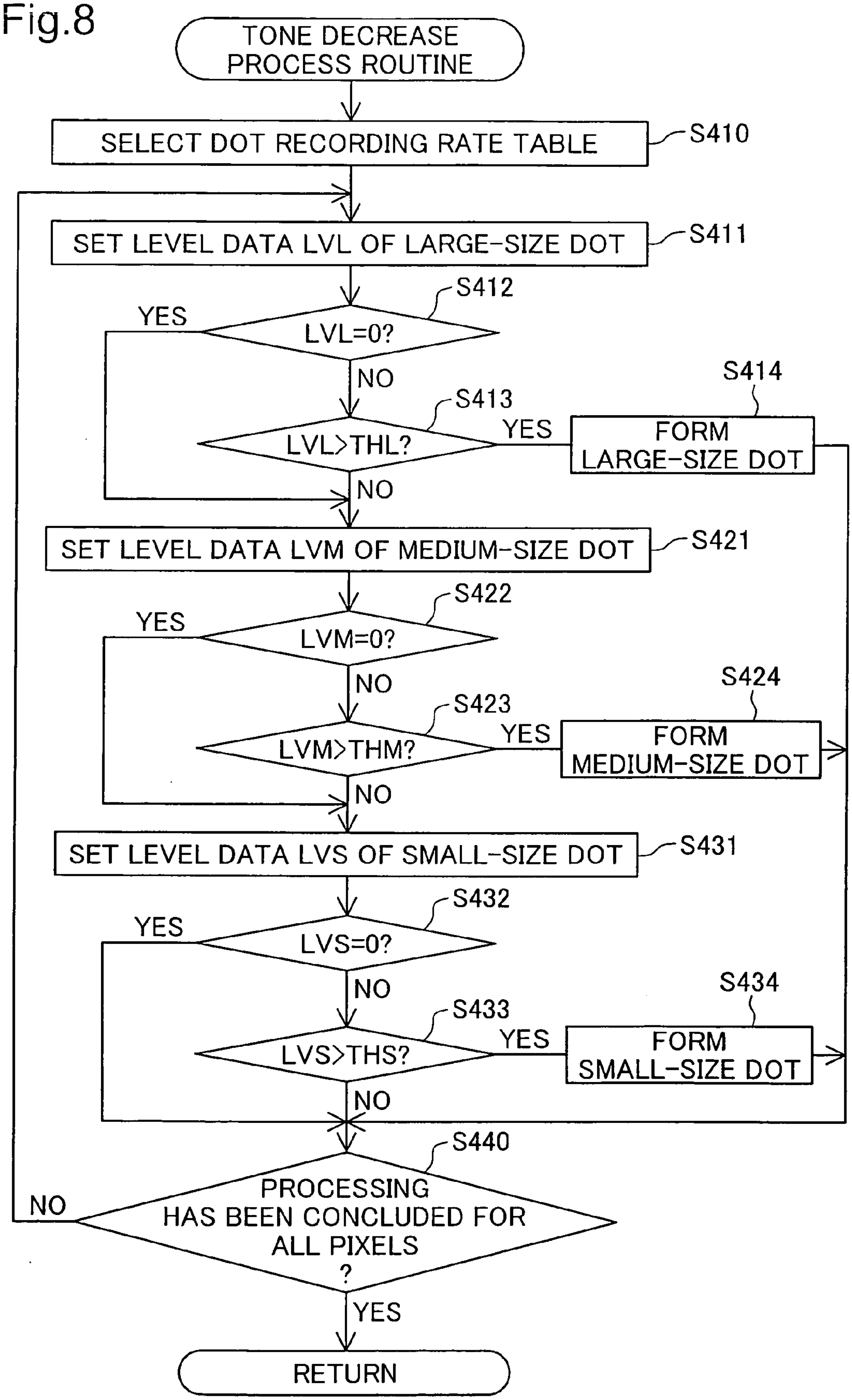
FIG. 8 is a flowchart showing the details of the tone-decreasing process executed in the first embodiment of the invention.

FIG. 8 is a flowchart showing the details of the tone-decreasing process executed in the first embodiment of the invention. At step S410, the tone-decreasing module 99 selects one among multiple dot recording rate tables DT, which include a color dot recording rate table DTc and a transparent dot recording rate table DTt described later.

The color dot recording rate table DTc and the transparent dot recording rate table DTt respectively store color dot recording rates or dot recording rates of color dot with the color ink and transparent dot recording rates or dot recording rates of transparent dot with the quality-enhancing ink. Here the terminology 'transparent dot' represents a dot formed with the quality-enhancing ink and may not be completely transparent.

The tone-decreasing module 99 selects the color dot recording rate table DTc to determine the color dot recording rate, while selecting the transparent dot recording rate table DTt to determine the transparent dot recording rate at step S410. The color dot and the transparent dot are subjected to substantially the same tone-decreasing process with only difference in selected dot recording rate table. The following description thus regards the tone-decreasing process with regard to the color dot.

At step S411, the tone-decreasing module 99 refers to the color dot recording rate table DTc to set level data LVL of the large-size dot. The level data represents data of 256 levels in a range of 0 to 255 converted from the dot recording rate.

Figure 9:
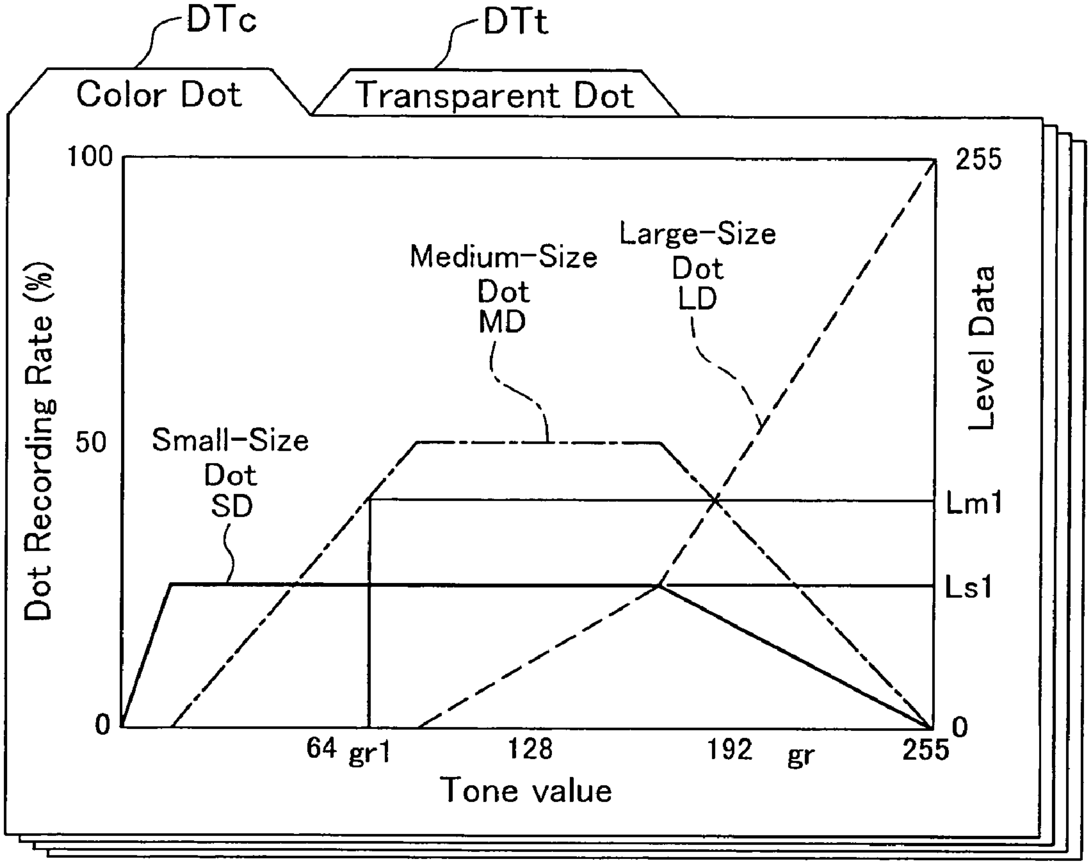
FIG. 9 shows dot recording rate tables used to determine level data of the three variable-size dots, that is, the large-size, medium-size, and small-size dots.

FIG. 9 shows the dot recording rate tables DT used to determine level data of the three variable-size dots, that is, the large-size, medium-size, and small-size dots. The dot recording rate tables DT include the color dot recording rate table DTc and the transparent dot recording rate table DTt, as mentioned above. FIG. 9 shows the contents of the color dot recording rate table DTc. The color dot recording rate table DTc may be provided for each color ink according to the characteristics of the color ink.

The color dot recording rate table DTc has the tone value (0 to 255) as the abscissa, the dot recording rate (%) as the left ordinate, and the level data (0 to 255) as the right ordinate. Here the terminology 'dot recording rate' represents a ratio of dot-on pixels to all the pixels in a homogeneous area reproduced according to a fixed tone value. Curves SD, MD, and LD in FIG. 9 respectively denote a variation in dot recording rate of the small-size dot, a variation in dot recording rate of the medium-size dot, and a variation in dot recording rate of the large-size dot.

Level data LVL, LVM, and LVS respectively represent data converted from the dot recording rate of the large-size dot, the dot recording rate of the medium-size dot, and the dot recording rate of the small-size dot. In the illustrated example of FIG. 9, the curves LD, MD, and SD respectively give zero as the large-size dot level data LVL, Lm1 as the medium-size dot level data LVM, and Ls1 as the small-size dot level data LVS against a tone value gr1 of the multi-tone data.

At step S412, the tone-decreasing module 99 determines whether the level data LVL of the large-size dot is equal to zero. When the level data LVL of the large-size dot is equal to zero, the routine skips subsequent comparison (step S413) and goes to step S421. When the level data LVL of the large-size dot is not equal to zero, on the other hand, the routine goes to step S413.

The zero level data LVL requires no formation of the large-size dot without comparison (step S413). Such determination thus desirably saves the time required for the obvious comparison and heightens the total processing speed.

At step S413, the tone-decreasing module 99 compares the level data LVL set at step S411 with a preset threshold value THL to determine the dot on-off state in each pixel according to, for example, the systematic dither method. A dither matrix used in the systematic dither method has different settings of the threshold value THL to individual pixels in a pixel group. The procedure of this embodiment uses a dither matrix having settings in a range of 0 to 254 corresponding to a 16×16 square pixel block.

Figure 10:
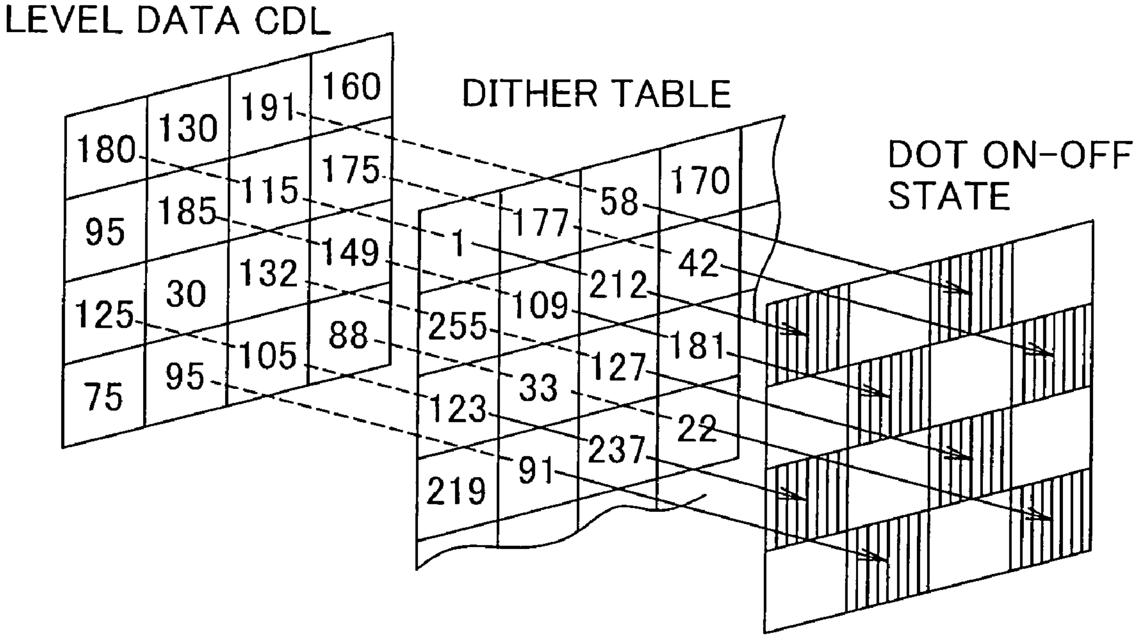
FIG. 10 shows the principle of specifying the dot on-off state according to the systematic dither method.

FIG. 10 shows the principle of specifying the dot on-off state according to the systematic dither method. For convenience of illustration, data with regard to only part of the pixels are shown in FIG. 10. The level data LVL of the respective pixels are compared with corresponding values in a dither table. A dot is to be formed when the level data LVL is greater than the corresponding threshold value THL in the dither table. No dot is to be formed, on the other hand, when the level data LVL is smaller than the threshold value THL. Hatched squares in FIG. 10 denote dot-on pixels.

When the level data LVL is greater than the threshold value THL at step S413, the routine specifies formation of the large-size dot (step S414). When the level data LVL is smaller than the threshold value THL at step S413, on the other hand, the routine specifies no formation of the large-size dot and goes to step S421.

At step S421, the tone-decreasing module 99 sets the level data LVM of the medium-size dot in the same manner as the level data LVL of the large-size dot. It is then determined whether the setting of the level data LVM of the medium-size dot is equal to zero (step S422), in the same manner as step S412. Only when the determination shows that the level data LVM of the medium-size dot is not equal to zero, the routine carries out subsequent comparison (step S423) and specifies formation or no formation of the medium-size dot (step S424).

The routine then carries out the series of processing with regard to the small-size dot at steps S431 to S434 substantially in the same manner as those for the large-size dot and the medium-size dot. When the above series of processing with regard to the color ink has been concluded for all the pixels (step S440), the active dot recording rate table to be referred to for the processing is changed over to the transparent dot recording rate table (step S410). After completion of the processing with the transparent dot recording rate table, the routine goes to step S500 (FIG. 7).

At step S500, the print data generation module 100 rearranges the dot data representing the dot on-off state of the respective pixels in an order of data to be transferred to the color printer 20 and outputs the rearranged dot data as final print data PD. The print data PD include raster data representing the dot recording state of each main scan and data representing sub-scan feeds.

The tone-decreasing process of this embodiment has the higher processing speed with an increase in number of the zero level data. The increased number of zero level data raises the frequency of bypassing the comparison with the dither matrix. The transparent dot recording rate table DTt discussed later is designed by taking into account this fact. The color dot recording rate table DTc is designed, on the other hand, to enhance the resulting quality, for example, the lowered granularity and the lowered visibility of banding.

Figure 11A:
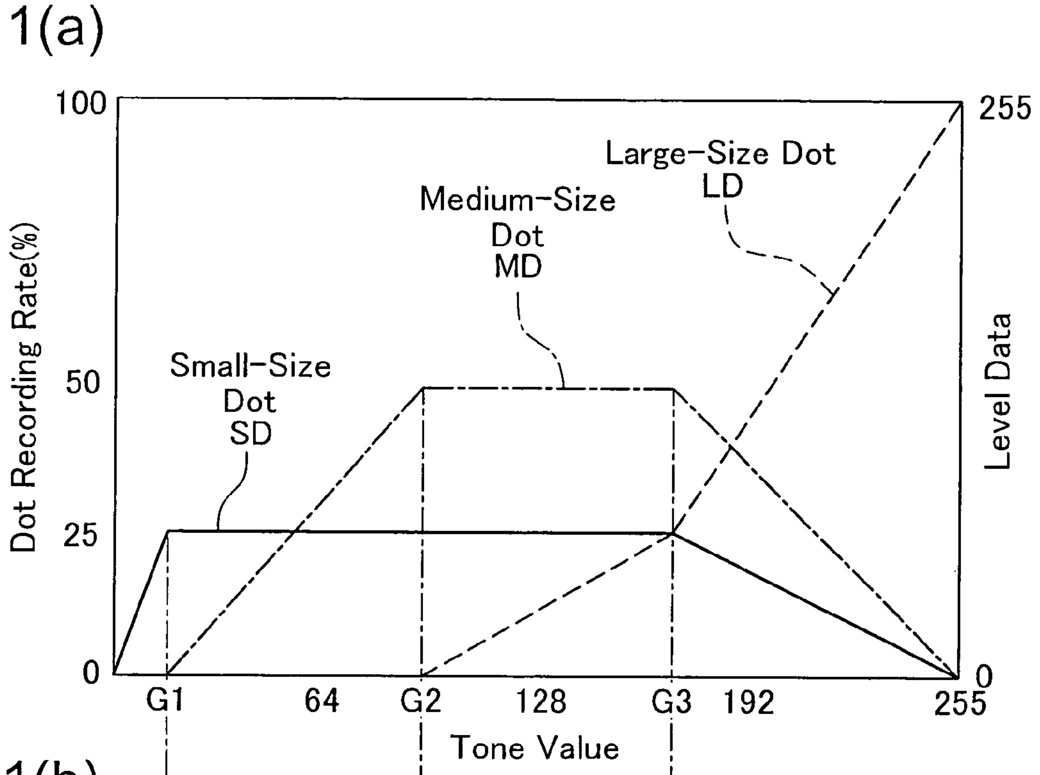
FIGS. 11(*a*) and 11(*b*) show a dot recording rate table and a variation in quantity of ink ejection.
Figure 11B:
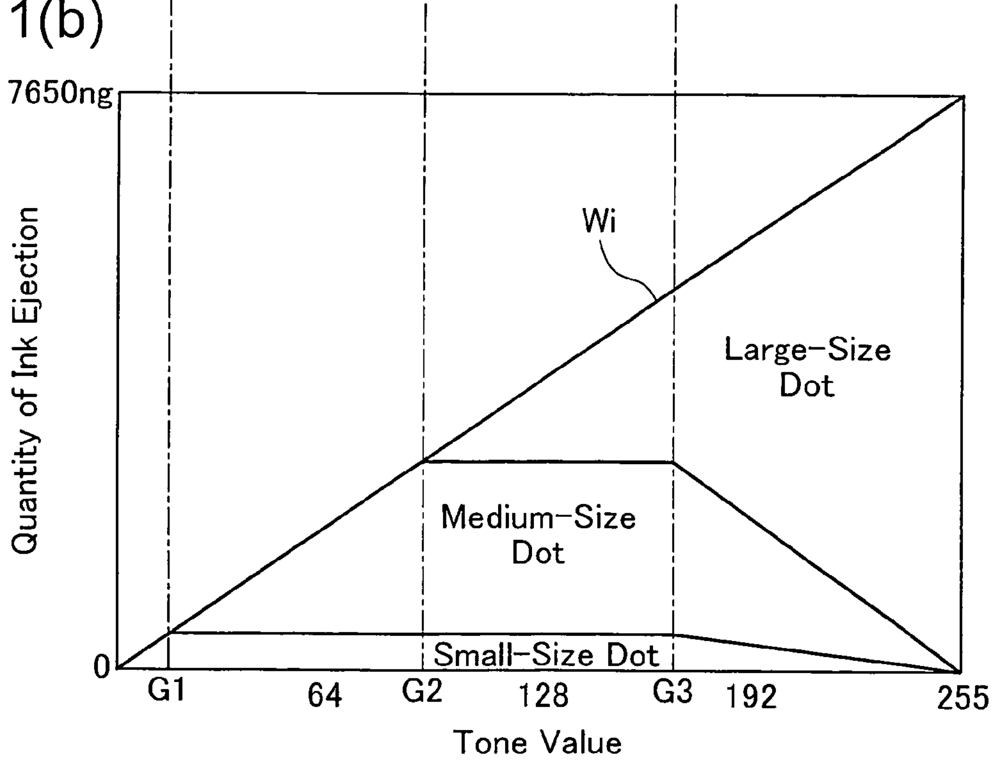

FIGS. 11(*a*) and 11(*b*) show a dot recording rate table and a variation in quantity of ink ejection. FIG. 11(*a*) shows variations in dot recording rate of the respective size dots against the tone value of multi-tone data and is equivalent to the color dot recording rate table DTc shown in FIG. 9. FIG. 11(*b*) shows a variation in weight of ink ejected in a preset area against the tone value. The preset area consists of 255 pixels. Here it is assumed that the weight of ink is 10 ng for the small-size dot, 20 ng for the medium-size dot, and 30 ng for the large-size dot.

FIG. 11(*b*) gives a plot of the following product against the tone value:

(1) the dot recording rate of each size dot (for example, 25% for the small-size dot and 50% for the medium-size dot at a tone value G2);

(2) the weight of ink (10 ng for the small-size dot, 20 ng for the medium-size dot, and 30 ng for the large-size dot); and (3) the number of pixels in the preset area (=255 pixels). The resulting product is 7650 ng (=100%×30 ng×255 pixels) at the tone value of 255 (the maximum tone value).

As clearly understood from the plot of FIG. 11(*b*), the quantity of ink ejection increases from 0 ng to 7650 ng along a straight line Wi with an increase in tone value from 0 to 255. For the simplicity of explanation, it is assumed in this embodiment that the weight of ink ejected in the preset area has a linear relation to the tone value.

The weight of ink ejected in the preset area increases in the following profile with an increase in tone value as shown in FIGS. 11(*a*) and 11(*b*):

(1) In a range from the tone value 0 to a tone value G1, the weight of ink linearly increases with an increase in dot recording rate of the small-size dot;

(2) In a range from the tone value G1 to a tone value G2, the dot recording rate of the small-size dot is fixed, and the weight of ink linearly increases with an increase in dot recording rate of the medium-size dot;

(3) In a range from the tone value G2 to a tone value G3, the dot recording rates of the small-size dot and the medium-size dot are fixed, and the weight of ink linearly increases with an increase in dot recording rate of the large-size dot; and (4) In a range from the tone value G3 to the maximum tone value, the dot recording rates of the small-size dot and the medium-size dot decrease, and the weight of ink linearly increases by replacement of the small-size dot and the medium-size dot with the large-size dot.

This dot recording rate profile is given as the result of trade-off in this embodiment:

(1) The lowered granularity (lowered roughness of the resulting image) generally results from a decrease in dot recording rate of the conspicuous, relatively large-size dot and an increase in dot recording rate of the relatively small-size dot. This tendency is especially prominent in a low tone range; and (2) The lowered visibility of banding (deterioration of the picture quality by the appearance of streaks) requires replacement of the relatively small-size dot with the relatively large-size dot and a resulting decrease in dot recording rate of the relatively small-size dot. This tendency is especially prominent in a high tone range.

As the result of trade-off, the profile set in this embodiment is 25% as the upper limit of the dot recording rate of the small-size dot and 50% as the upper limit of the dot recording rate of the medium-size dot.

FIGS. 12(*a*), 12(*b*), and 12(*c*) show the appearance of banding in relation to the dot recording rates of the small-size dot and the medium-size dot. Each encircled numeral denotes a nozzle number allocated to a nozzle that is activated to form a dot at each corresponding pixel position. In this illustrated example, dots formed by a No. 5 nozzle are deviated upward by, for example, a manufacturing error, to cause banding.

As shown in FIG. 12(*a*), banding is distinctly observed at the dot recording rate of the small-size dot equal to 100%. Banding is also visible at a lowered level of the dot recording rate as shown in FIG. 12(*b*).

In the state of FIG. 12(*c*), an identical quantity of ink is ejected in an identical area with the state of FIG. 12(*b*). The dot pattern of FIG. 12(*c*) and the dot pattern of FIG. 12(*b*) accordingly express an identical tone. In the dot pattern of FIG. 12(*c*), six small-size dots in FIG. 12(*b*) are replaced by three medium-size dots.

The appearance of banding is inconspicuous in the dot pattern of FIG. 12(*c*), compared with the dot pattern of FIG. 12(*b*). This inconspicuousness is ascribed to separation of the white streak in FIG. 12(*b*) by two medium-size dots formed by No. 4 and No. 5 nozzles. Such separation makes the white streak inconspicuous as deterioration of the picture quality.

Figure 13:
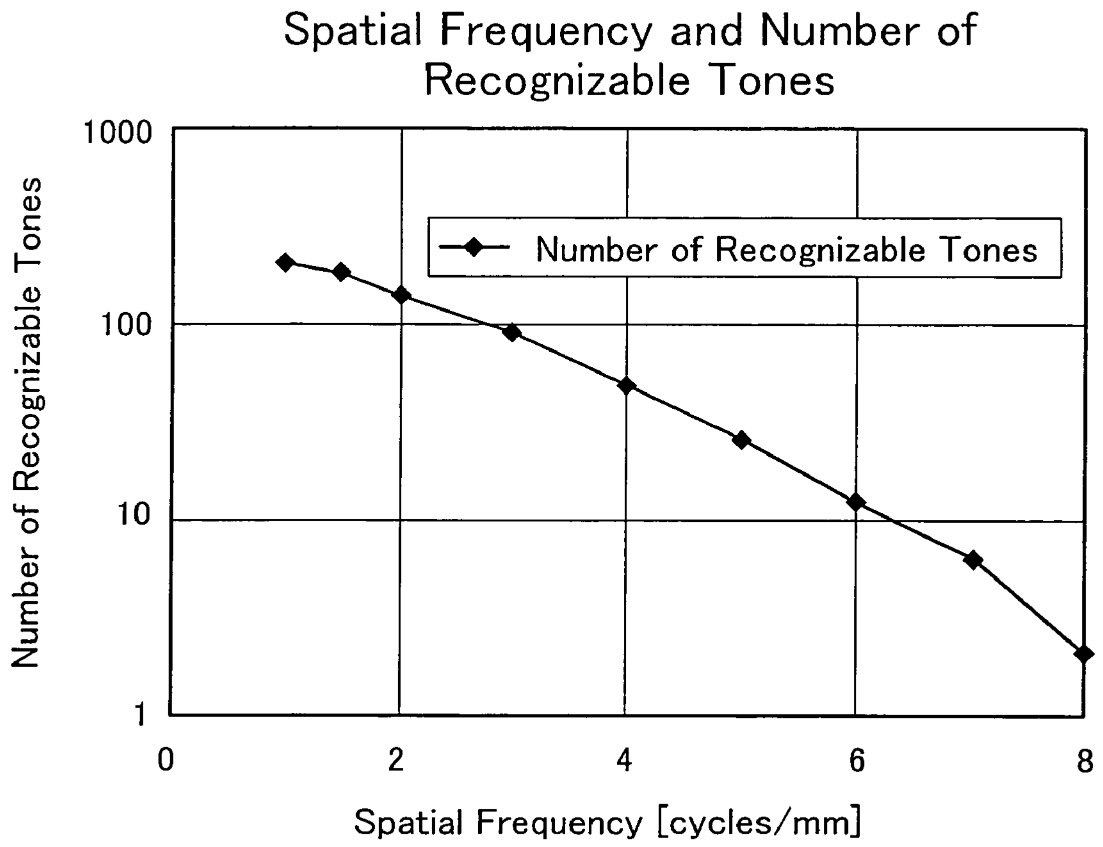
FIG. 13 is a graph showing a variation in recognizable number of tones by the human visual characteristics against the spatial frequency.

FIG. 13 is a graph showing a variation in recognizable number of tones by the human visual characteristics against the spatial frequency. This graph clearly shows a decrease in number of recognizable number of tones with an increase in spatial frequency.

For example, in the case where the printing resolution is 720 dpi in the main scanning direction, the spatial frequency of each pixel is 28 cycles/mm (=720 dpi/25.4 mm). The appearance of a white streak having a length of 10 pixels in the main scanning direction is equivalent to 2.8 cycles/mm in the spatial frequency. This white streak appears in an approximately 100 tone-recognizable range by the human visual characteristics. Namely deterioration of the picture quality by the white streak is highly visible as banding.

The separated white streak as shown in FIG. 12(*c*) is hardly recognizable by the human vision. For example, the length of the white streak shortened to 3 pixels by such separation is equivalent to over 9 cycles/mm in the spatial frequency. The deterioration of the picture quality in this range is hardly recognizable by the human vision.

The potential for the appearance of banding is heightened by increasing the dot recording rate of the small-size dot alone or by raising the dot recording rate of the small-size dot under the condition of an extremely low dot recording rate of the medium-size dot. A high ratio of the medium-size dot, however, worsens the granularity (roughness of the resulting image), since the medium-size dot is more visible than the small-size dot. This tendency is also observed in the relation between the medium-size dot and the large-size dot.

The optimum value based on the result of trade-off between banding and granularity is accordingly set to the dot recording rate of each size dot in the color dot recording rate table DTc. The dot formed with the quality-enhancing ink is substantially transparent. There is accordingly little necessity of taking the appearance of banding and the granularity into account for determination of the dot recording rates of the respective size dots. The transparent dot recording rate table DTt is thus desirably set to enhance the processing speed.

Figure 14A:
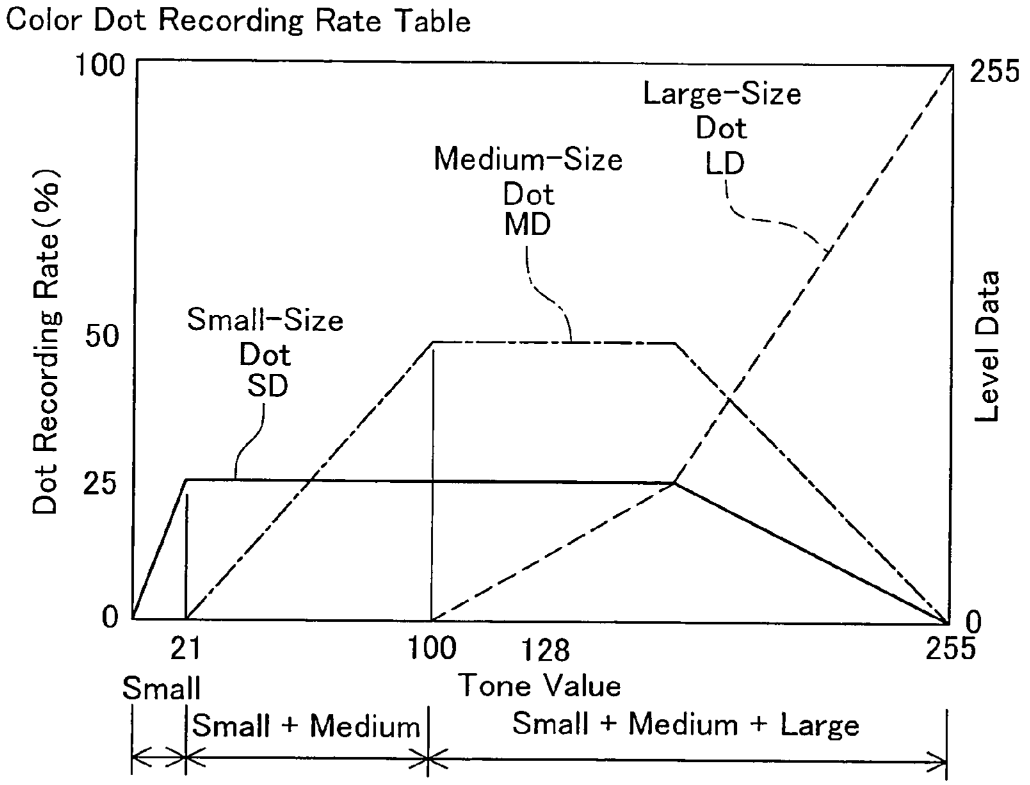
FIGS. 14(*a*) and 14(*b*) show a color dot recording rate table and a transparent dot recording rate table adopted in the first embodiment of the invention.
Figure 14B:
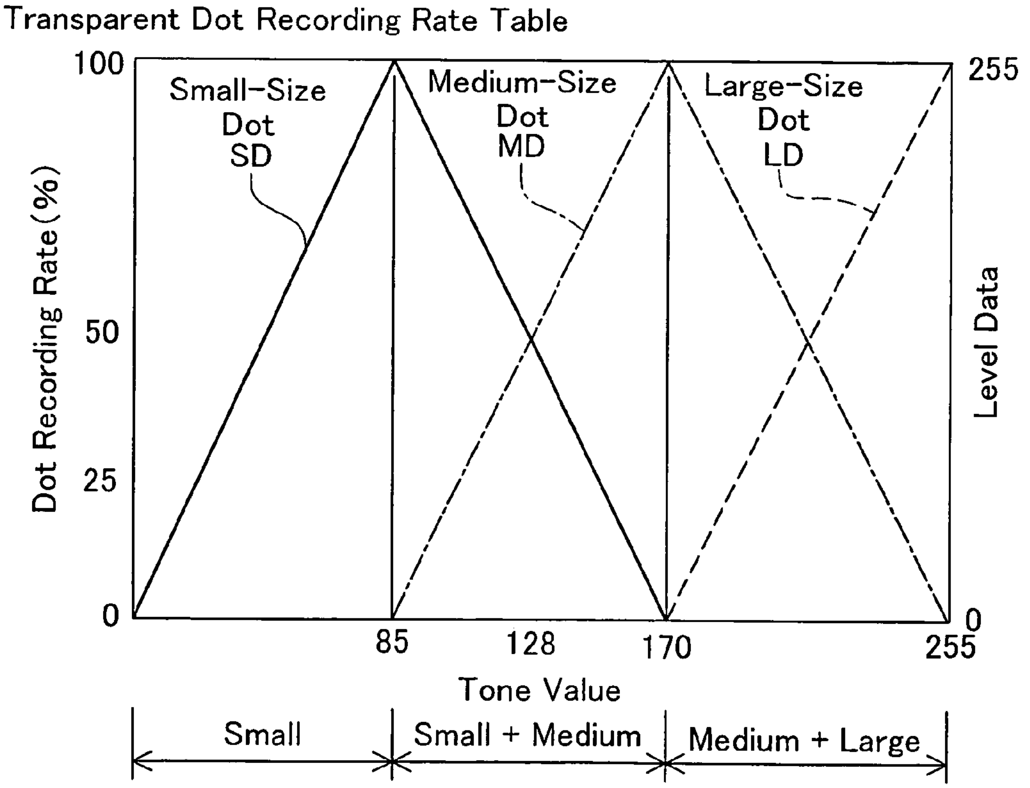

FIGS. 14(*a*) and 14(*b*) show the color dot recording rate table DTc and the transparent dot recording rate table DTt adopted in the first embodiment of the invention. FIG. 14(*a*) shows the color dot recording rate table DTc, and FIG. 14(*b*) shows the transparent dot recording rate table DTt.

As clearly shown in FIG. 14(*a*), the upper limits of the dot recording rates of the small-size dot and the medium-size dot are respectively set equal to 25% and 50% in the color dot recording rate table DTc. In the transparent dot recording rate table DTt, on the other hand, the dot recording rates of the small-size dot and the medium-size dot have no upper limits but reach 100% at the maximum.

The three variable-size dots are accordingly allocated as:

(1) The tone range expressible by only one size dot is limited to 21 tones in a tone value range of 0 to 20 in the color dot recording rate table DTc, but is extended to 85 tones in a tone value range of 0 to 84 in the transparent dot recording rate table DTt;

(2) The tone range expressible by two variable-size dots is limited to 79 tones in a tone value range of 21 to 99 in the color dot recording rate table DTc, but is extended to 171 tones in a tone value range of 85 to 255 in the transparent dot recording rate table DTt; and (3) The tone range requiring three variable-size dots for tone expression has 156 tones in a tone value range of 100 to 255 in the color dot recording rate table DTc, while the transparent dot recording rate table DTt has no such a range.

The transparent dot recording rate table DTt is configured to have a greater ratio of the number of tones expressible by a relatively less variety of dots to the total number of tones than an equivalent ratio in the color dot recording rate table. The tone expression by the relatively less variety of dots means a greater variety of unused dots for the tone expression. Each unused size dot for the tone expression has zero level data.

The procedure of this embodiment applies the transparent dot recording rate table DTt to tone-decreasing of the quality-enhancing ink to increase the ratio of the zero level data. This heightens the potential for bypassing the comparison with the dither matrix in the tone-decreasing process (see FIG. 8). Such bypassing desirably reduces the frequency of time-consuming comparison between the level data and the dither matrix and thereby shortens the total time required for printing.

In the transparent dot recording rate table DTt of this embodiment, the number of tones expressible by only the smallest-size dot among multiple different-size dots is 85 in the low tone range. This number is significantly greater than 21 as the equivalent expressible number of tones in the color dot recording rate table DTc. The quality-enhancing ink is generally used at the highest frequency in the low tone range. The procedure of this embodiment thus remarkably increases the number of the zero level data set in the tone-decreasing process of the quality-enhancing ink. As mentioned previously, the small-size dot and the medium-size dot of this embodiment correspond to the 'specific dot' in the claims of the invention.

C. Print Data Generation Process in Second Embodiment

Figure 15:
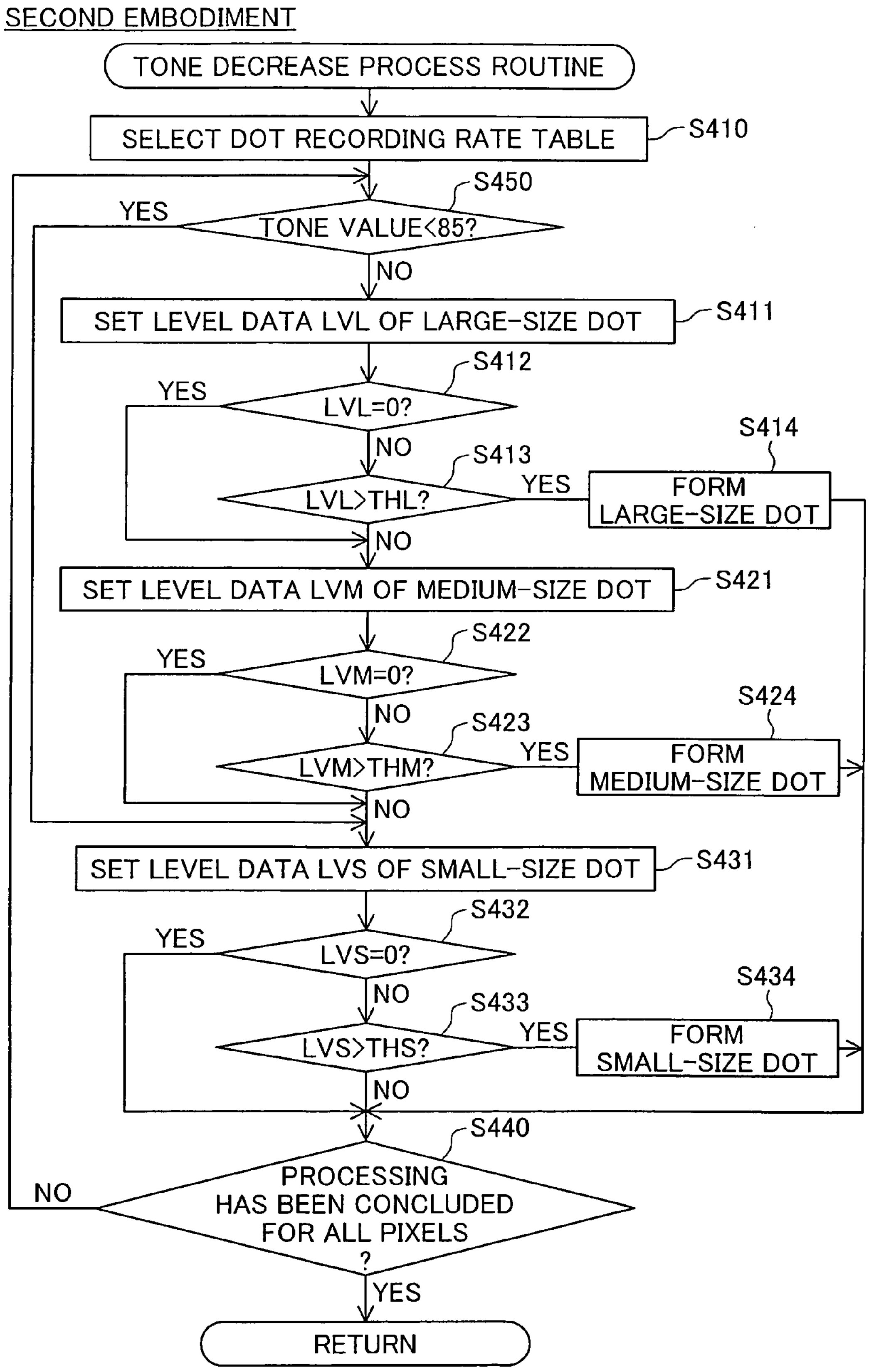
FIG. 15 is a flowchart showing the details of the tone-decreasing process in a second embodiment of the invention.

FIG. 15 is a flowchart showing the details of the tone-decreasing process in a second embodiment of the invention. The primary difference between the tone-decreasing process of the second embodiment and the tone-decreasing process of the first embodiment is an additional step (step S450) applied to only the tone-decreasing with regard to the quality-enhancing ink. This additional step ensures the higher processing speed of tone-decreasing with regard to the quality-enhancing ink.

At step S450, the tone-decreasing module 99 determines whether the tone value of each target pixel is smaller than a predetermined threshold value '85'. When the tone value of the target pixel is smaller than the predetermined threshold value, the series of processing to determine the dot on-off state of the large-size dot and the medium-size dot (steps S411 to S424) is totally bypassed in the routine of FIG. 15. Such bypassing is allowed since the transparent dot recording rate table DTt is set to form no large-size dot or medium-size dot at the tone value of or below 85 as shown in FIG. 14.

When the tone value of the target pixel is smaller than the predetermined threshold value, the routine of this embodiment specifies no formation of the large-size dot and the medium-size dot and generates dot data to express the tone value by only the small-size dot. Only the simple comparison between the tone value and the predetermined threshold value is required for determination of the dot on-off states of the large-size dot and the medium-size dot. This arrangement further shortens the total time required for printing.

When the tone value of the target pixel is smaller than the predetermined threshold value, the procedure of this embodiment specifies no formation of the large-size dot and the medium-size dot and generates dot data to express the tone value by only the small-size dot. One possible modification may specify no formation of the small-size dot and generate dot data to express the tone value of each target pixel by the large-size dot and the medium-size dot, when the tone value is greater than a predetermined threshold value '170'.

The general procedure specifies no formation of at least one type of dot among multiple different types of dots and generates dot data to express the tone value of each target pixel by the other types of dots, when the tone value is in a preset range.

Figure 16:
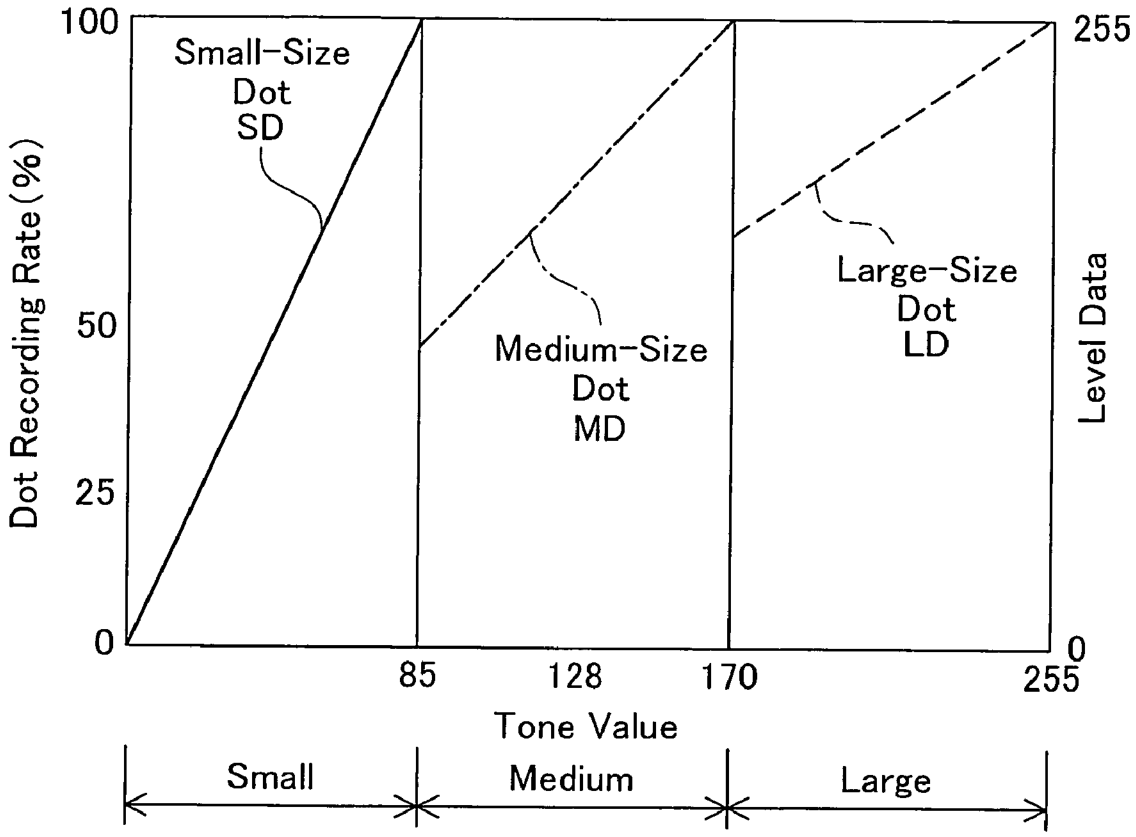
FIG. 16 shows another example of the transparent dot recording rate table.

In each of the embodiments discussed above, the small-size dot and the medium-size dot are the specific dots. The large-size dot may be set to the specific dot. For example, in a transparent dot recording rate table of FIG. 16, all the large-size dot, the medium-size dot, and the small-size dot correspond to the 'specific dot' in the claims of the invention. The requirement of the invention is that there is at least one specific dot. Setting the smallest-size dot among multiple different-size dots to the specific dot ensures the accurate and detailed expression by the single type of dot in a tone range where the quality-enhancing ink is used at the highest frequency, and thus distinctly exerts the expected effects of the invention.

In each of the embodiments discussed above, the transparent dot recording rate table is configured to have a greater ratio of the number of tones expressible by only the specific dot to the total number of tones than an equivalent ratio in the color dot recording rate table. The transparent dot recording rate table may be configured to have a greater ratio of colors requiring formation of only a specific dot among multiple different types of dots to all the colors expressed by pixel values of given image data in respective pixels than an equivalent ratio of the colors requiring formation of only the specific dot in the color dot recording rate table. Such settings of the transparent dot recording rate table are applicable to the color conversion process, as well as the tone-decreasing process in the series of image processing.

D. Print Data Generation Process in Third Embodiment of the Invention

Figure 17A:
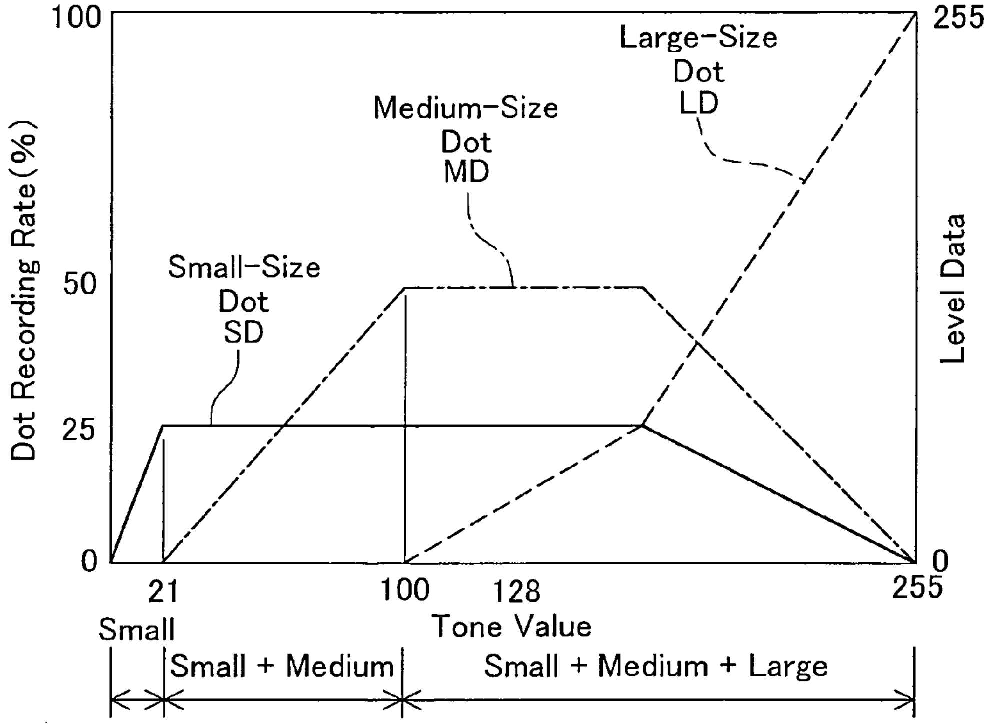
FIGS. 17(*a*) and 17(*b*) show a color dot recording rate table and a transparent dot recording rate table adopted in a third embodiment of the invention.
Figure 17B:
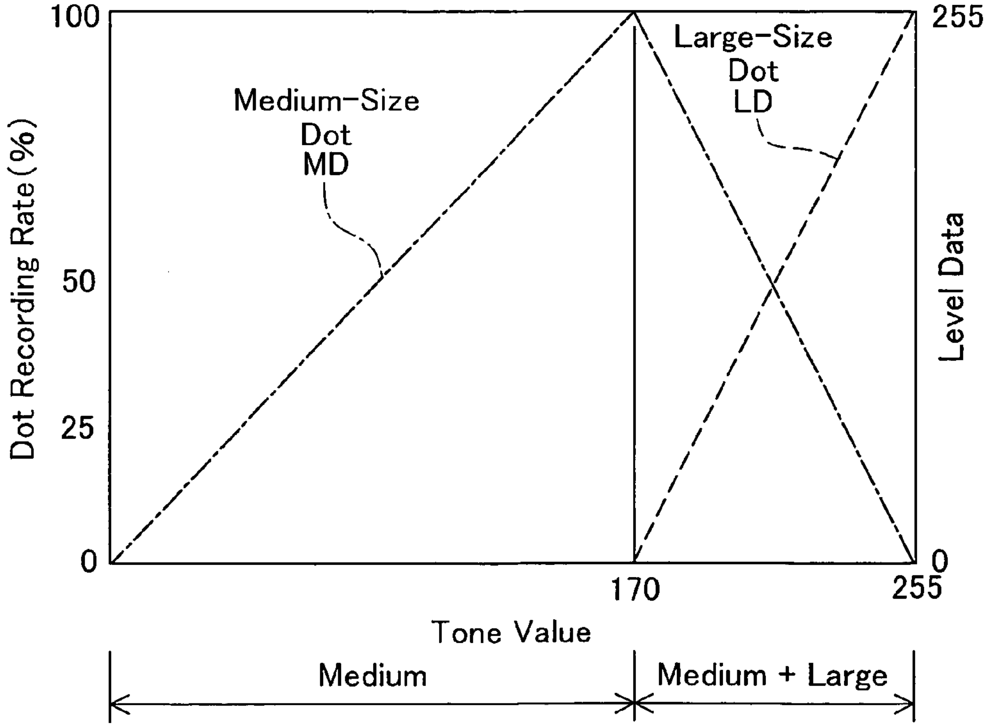

FIGS. 17(*a*) and 17(*b*) show a color dot recording rate table DTc and a transparent dot recording rate table DTt adopted in a third embodiment of the invention. FIG. 17(*a*) shows the color dot recording rate table DTc, and FIG. 17(*b*) shows the transparent dot recording rate table DTt.

As shown in FIG. 17(*a*), the color dot recording rate table DTc has the settings of the dot recording rates of the respective size dots to express each tone value by the three variable-size dots, that is, the large-size, the medium-size, and the small-size dots. The transparent dot recording rate table DTt, on the other hand, has the settings of the dot recording rates of the respective size dots to express each tone value by only the two size dots, that is, the large-size and the medium-size dots. The dot recording rate of the small-size dot is thus fixed to zero against all the tone values in the transparent dot recording rate table DTt.

The tone range expressible by only one type of dot is limited to 21 tones in a tone value range of 0 to 20 in the color dot recording rate table DTc, but is extended to 170 tones in a tone value range of 0 to 169 in the transparent dot recording rate table DTt.

The transparent dot recording rate table DTt is configured to have a greater ratio of the number of tones expressible by only the medium-size dot to the total number of tones than an equivalent ratio in the color dot recording rate table. The tone expression by a relatively less variety of dots means a greater variety of unused dots for the tone expression.

Figure 18A:
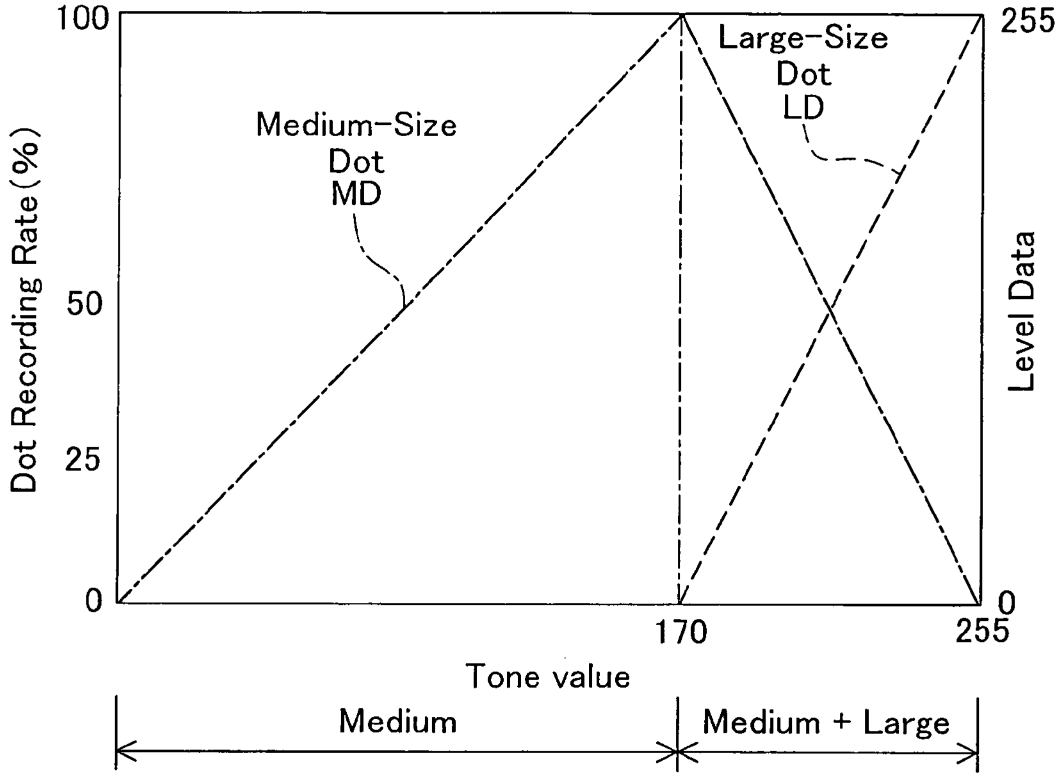
FIGS. 18(*a*) and 18(*b*) show a dot recording rate table and a variation in quantity of ink ejection in the third embodiment of the invention.
Figure 18B:
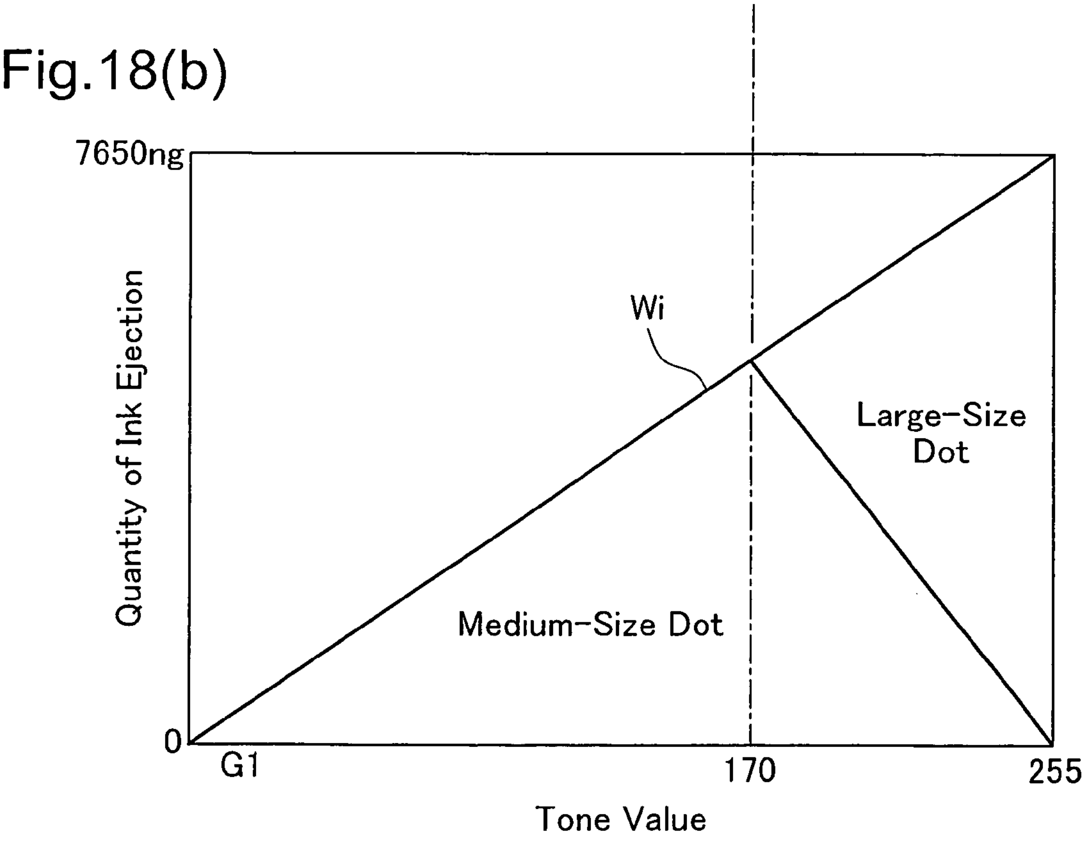

FIGS. 18(*a*) and 18(*b*) show a dot recording rate table and a variation in quantity of ink ejection in the third embodiment. FIG. 18(*a*) shows variations in dot recording rate of the respective size dots against the tone value of multi-tone data and is equivalent to the color dot recording rate table DTc shown in FIG. 17(*b*). FIG. 18(*b*) shows a variation in weight of ink ejected in a preset area against the tone value.

The weight of ink ejected in the preset area increases in the following profile with an increase in tone value as shown in FIGS. 18(*a*) and 18(*b*):

(1) In a range from the tone value 0 to a tone value 169, the weight of ink linearly increases with an increase in dot recording rate of the medium-size dot; and (2) In a range from a tone value 170 to the maximum tone value, the dot recording rate of the medium-size dot decreases, and the weight of ink linearly increases by replacement of the medium-size dot with the large-size dot.

Only the medium-size dot and the large-size dot are sufficiently used to regulate the quantity of ink ejection, as in the case of using the three variable-size dots.

Figure 19:
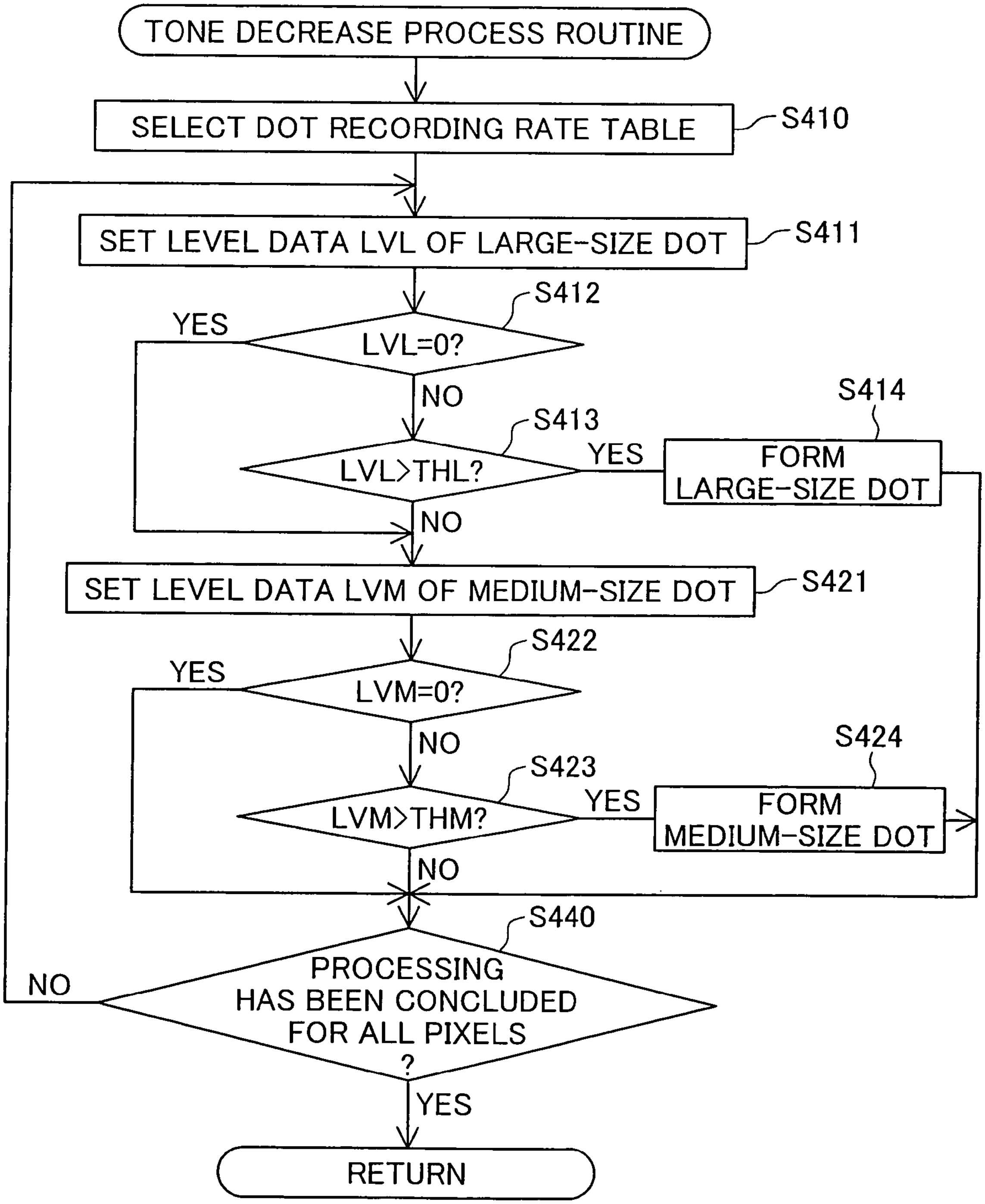
FIG. 19 is a flowchart showing the details of the tone-decreasing process with regard to the transparent dot in the third embodiment of the invention.

FIG. 19 is a flowchart showing the details of the tone-decreasing process with regard to the transparent dot in the third embodiment of the invention. The primary difference between the tone-decreasing process of the transparent dot and the tone-decreasing process of the color dot (see FIG. 8) in this embodiment is omission of the series of processing to determine the dot on-off state of the small-size dot (steps S431 to S434). The determination of the dot on-off state of the small-size dot is omitted, since the small-size dot is not formed regardless of the tone value.

The procedure of this embodiment applies the transparent dot recording rate table DTt having the settings of only the medium-size dot and the large-size dot to tone-decreasing of the quality-enhancing ink to increase the ratio of the zero level data. This heightens the potential for bypassing the comparison with the dither matrix in the tone-decreasing process (see FIG. 8). Such bypassing desirably reduces the frequency of time-consuming comparison between the level data and the dither matrix and thereby shortens the total time required for printing.

The series of processing to determine the dot on-off state of the small-size dot is omitted from the routine of this embodiment. This further shortens the total processing time. The small-size dot in this embodiment corresponds to the 'specific dot' in the claims of the invention.

E. Print Data Generation Process in Fourth Embodiment of the Invention

Figure 20A:
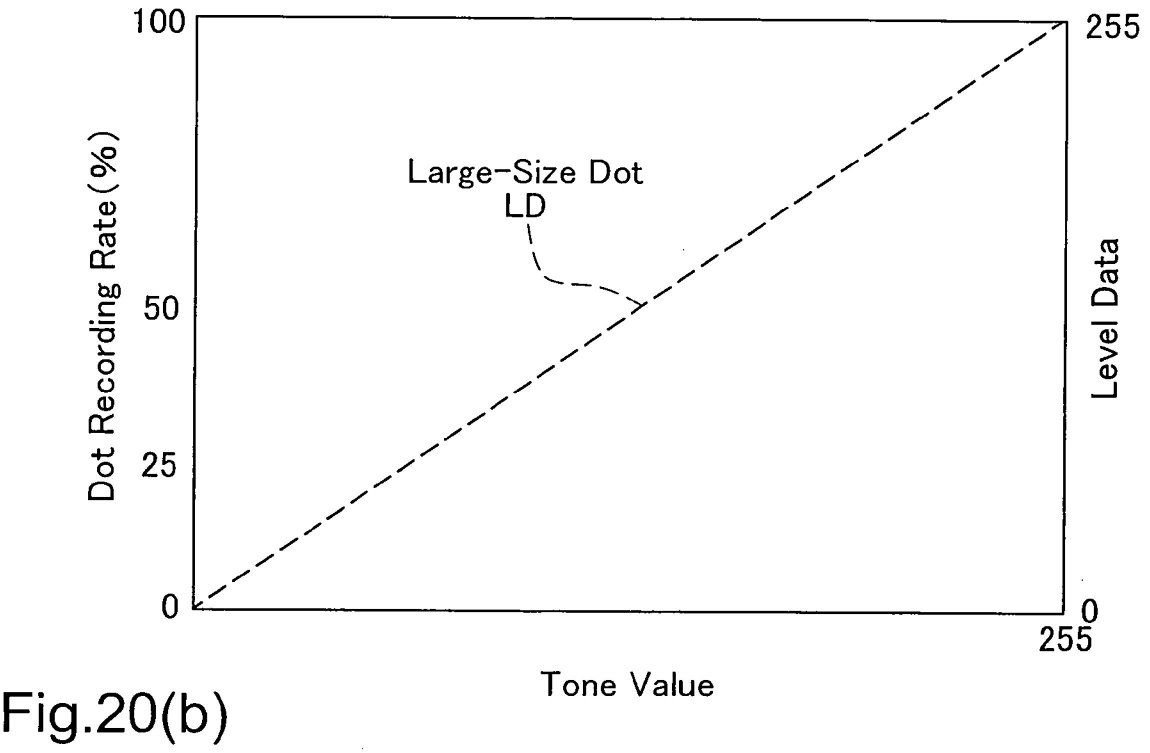
FIGS. 20(*a*) and 20(*b*) show a transparent dot recording rate table and a variation in quantity of ink ejection in a fourth embodiment of the invention.
Figure 20B:
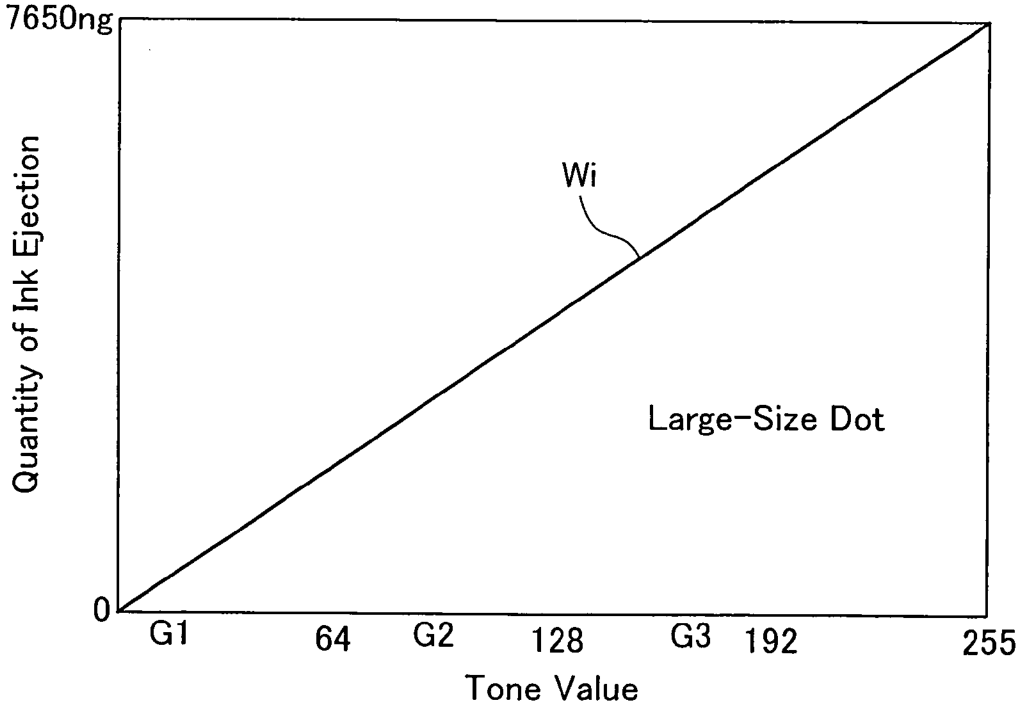

FIGS. 20(*a*) and 20(*b*) show a transparent dot recording rate table DTta adopted in a fourth embodiment of the invention. As shown in FIGS. 20(*a*) and 20(*b*), the transparent dot recording rate table DTta of the fourth embodiment has the settings of the dot recording rates of the respective size dots to express each tone value by only the large-size dot. In the transparent dot recording rate table DTta of this embodiment, the dot recording rates of both the small-size dot and the medium-size dot are fixed to zero against all the tone values.

Figure 21:
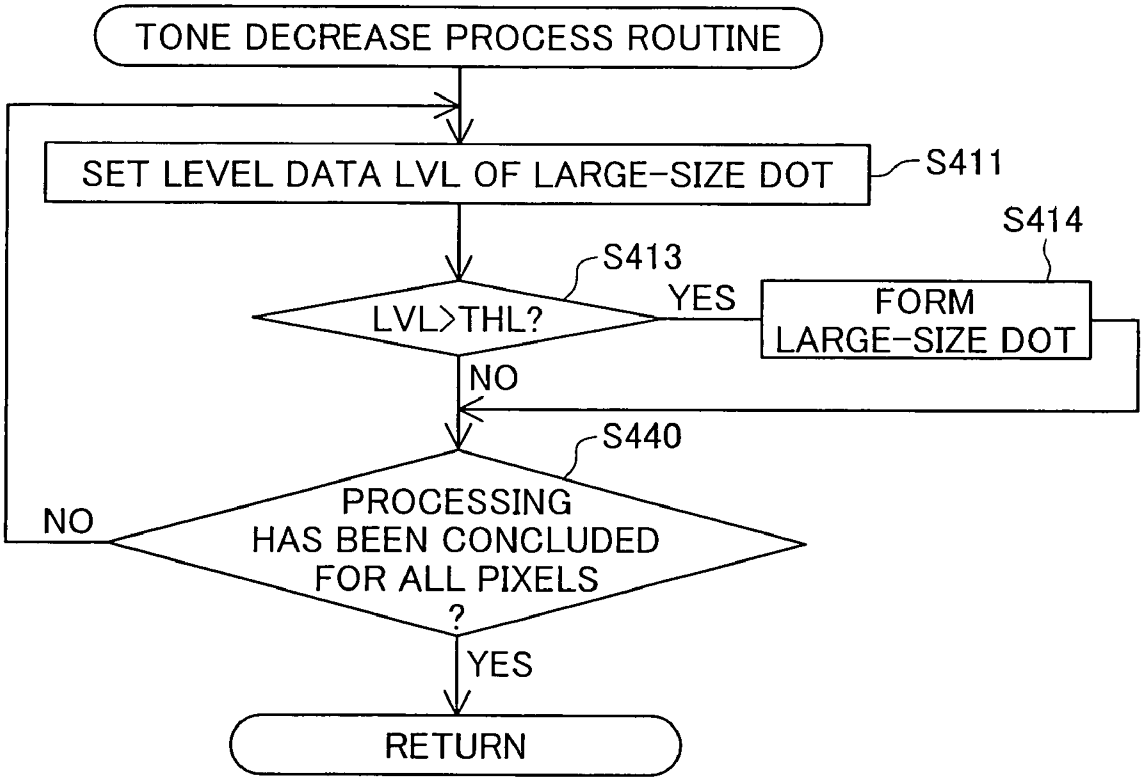
FIG. 21 is a flowchart showing the details of the tone-decreasing process with regard to the transparent dot in the fourth embodiment of the invention.

In this embodiment, the tone range expressible by only one type of dot is accordingly expanded to the whole level of tone values. As shown in FIG. 21, the tone-decreasing process of the transparent dot in this embodiment is different from the tone-decreasing process of the transparent dot in the third embodiment by further omitting the series of processing to determine the dot on-off state of the medium-size dot (steps S421 to S424). The tone-decreasing process of this embodiment thus requires determination of the dot on-off state of only the large-size dot by comparison with the dither matrix.

The procedure of this embodiment applies the transparent dot recording rate table DTta having the settings of only the large-size dot to tone-decreasing of the quality-enhancing ink to increase the ratio of the zero level data. This further shortens the total processing time required for printing. The advantage of the tone-decreasing with both the medium-size and the large-size dots in the third embodiment is minute ejection control of the quality-enhancing ink on the printing medium, compared with the tone-decreasing with only the large-size dot in the fourth embodiment. The small-size dot and the medium-size dot of this embodiment correspond to the 'specific dot' in the claims of the invention.

F. Print Data Generation Process in Fifth Embodiment

Figure 22A:
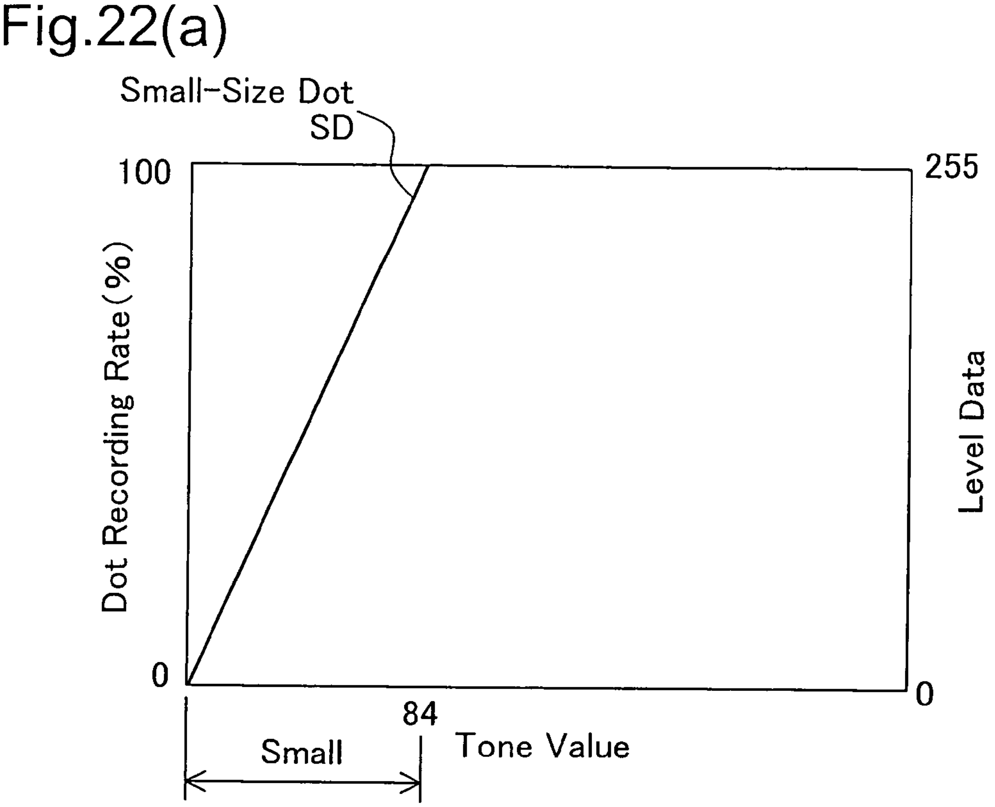
FIGS. 22(*a*) and 22(*b*) show transparent dot recording rate tables adoptable in a fifth embodiment of the invention.
Figure 22B:
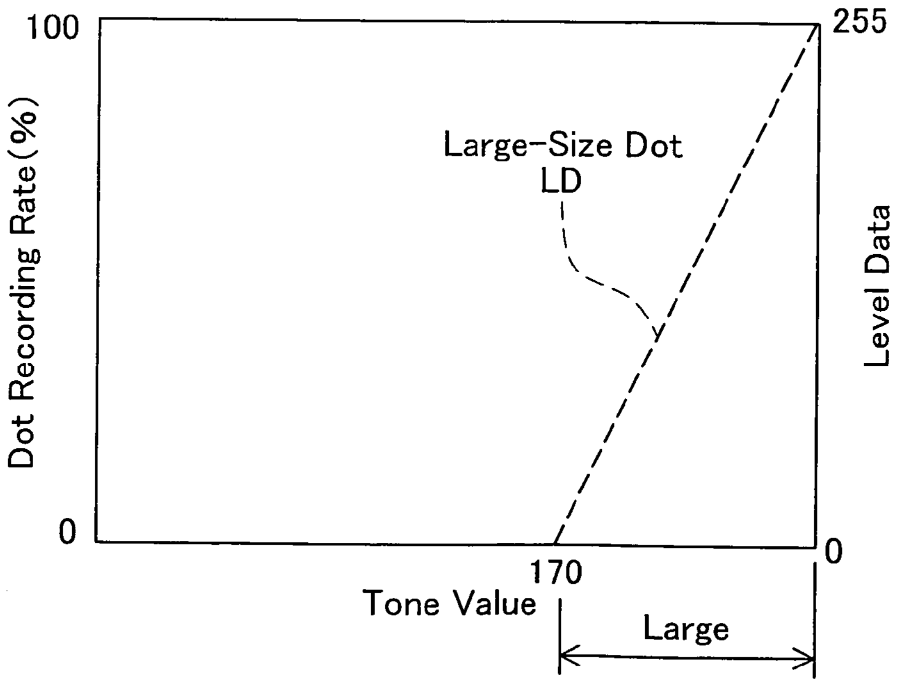

FIGS. 22(*a*) and 22(*b*) show transparent dot recording rate tables DTtb adoptable in a fifth embodiment of the invention. The dot recording rate table of FIG. 22(*a*) has the settings of the dot recording rate only in a relatively low tone range of 0 to 84, while having no settings of the dot recording rate in the residual tone range. The dot recording rate table of FIG. 22(*b*) has the settings of the dot recording rate only in a relatively high tone range of 170 to 255, while having no settings of the dot recording rate in the residual tone range.

The dot recording rate tables of FIGS. 22(*a*) and 22(*b*) are respectively applied to the quality-enhancing ink ejected only in the preset low tone range and to the quality-enhancing ink ejected only in the preset high tone range. The settings of these tables are adequate for ejection of the quality-enhancing ink in only the partial ranges of the tone values.

The transparent dot recording rate tables of this embodiment have the settings of the dot recording rate in only the partial ranges of the tone values. This arrangement desirably saves the data volume of the dot recording rate tables and thereby the consumption of a cache memory (not shown), thus enhancing the hit rate of the cache memory and accelerating the tone-decreasing process.

Figure 23A:
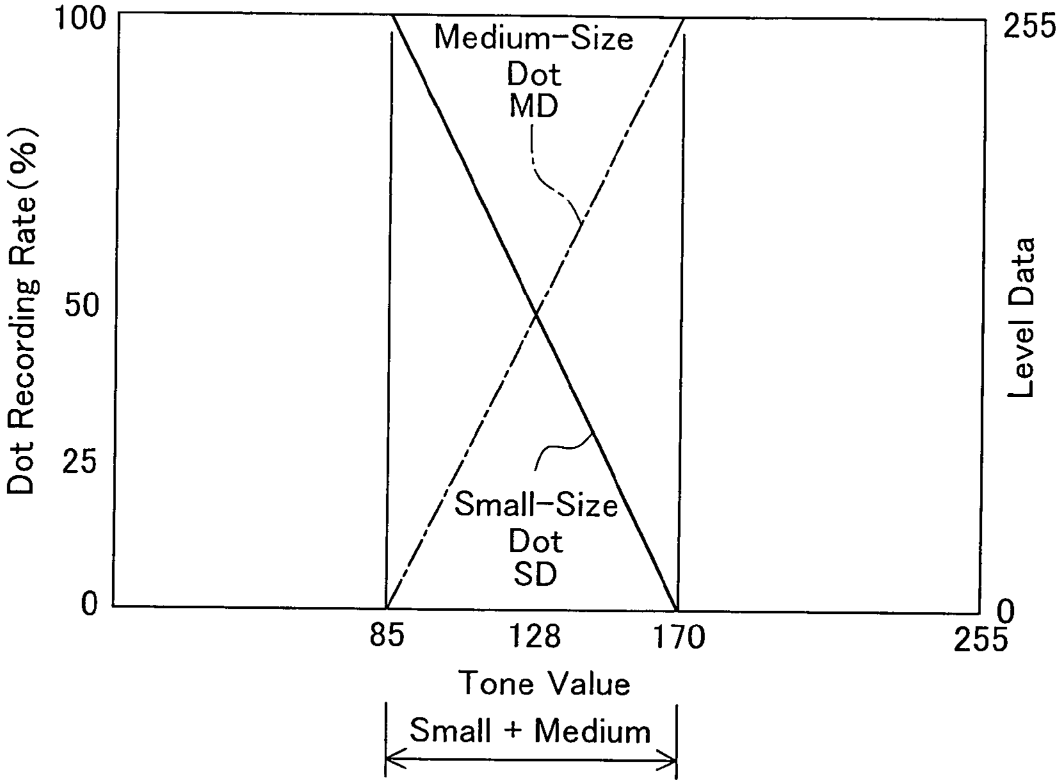
FIGS. 23(*a*) and 23(*b*) show other transparent dot recording rate tables adoptable in the fifth embodiment of the invention.
Figure 23B:
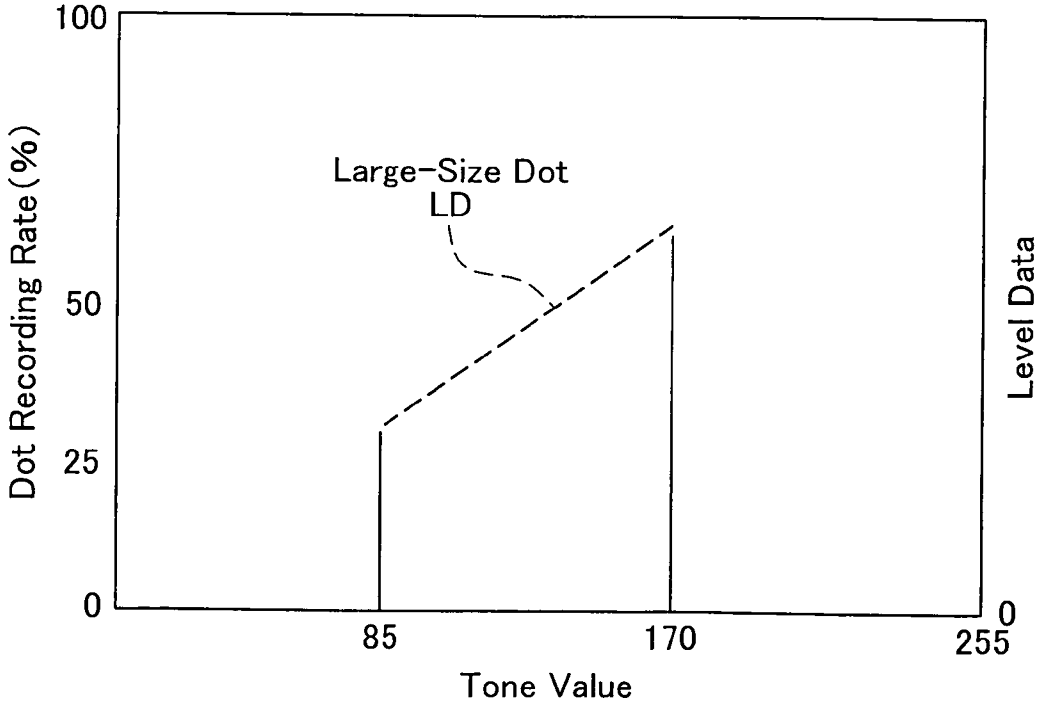

The dot recording rate tables of FIGS. 23(*a*) and 23(*b*) have settings of the dot recording rate only in intermediate tone ranges, given as other examples having the settings of the dot recording rate in the partial ranges of the tone values. The dot recording rate table may be set to allow for minute regulation of the quantity of ink ejection with the small-size dot and the medium-size dot (FIG. 23(*a*), or may be set to use only the large-size dot for the higher processing speed (FIG. 23(*b*)).

The data volume may otherwise be saved by increasing the quantization width and reducing the total number of tones. The increased quantization width naturally leads to an increased quantization error. The error in ejection quantity of the quality-enhancing ink, however, generally has smaller effects on the quality of the printed materials, compared with the error in ejection quantity of the color ink.

In a preferable procedure, such variety of transparent dot recording rate tables are selectively applied according to the printing environments, for example, the type of the quality-enhancing ink and the type of the printing medium.

G. Modifications

The embodiments discussed above and their modified examples are to be considered in all aspects as illustrative and not restrictive. There may be many other modifications, changes, and alterations without departing from the scope or spirit of the main characteristics of the present invention. Some examples of possible modification are given below.

G-1. Each of the above embodiments regards the printer that activates each nozzle to selectively form any of the three variable-size dots having different sizes in the area of one pixel on a printing medium. The printer may be capable of selectively creating two different types of dots or may be capable of selectively creating four or more different types of dots. The printer of the invention is required to activate each nozzle and selectively form any of N types of dots (where N is an integer of not less than 2) having different sizes in the area of one pixel on a printing medium.

G-2. In the embodiments discussed above, the systematic dither method is applied to reduce the number of tone values. Application of another tone-decreasing technique, for example, the error diffusion method, to reduce the number of tone values also exerts the sufficient effects of the invention.

The processing speed of the error diffusion method is also heightened by enhancing the potential for the appearance of the zero level data as described in the above embodiments. The zero level data specifies no dot formation in the error diffusion method. The zero level data and specification of non-dot formation give no error to be diffused, thus desirably reducing the required volume of computation.

Application of the invention tends to reduce the variety of dots formed with the quality-enhancing ink. In general, this reduces the volume of information for ejection control of the quality-enhancing ink. The reduced volume of information for ejection control is equivalent to the reduced volume of information to be generated. The principle of the invention is thus applicable to any of diverse tone-decreasing techniques to enhance the total processing speed.

G-3. The technique of the invention is not restricted to color printing but is also applicable to monochromatic printing. The invention is also applied to a printing technique that is capable of creating multiple dots in the area of one pixel to express multiple tones.

G-4. In any of the above embodiments, part of the hardware configuration may be replaced by the software configuration, while part of the software configuration may be replaced by the hardware configuration. For example, part or all of the functions of the printer driver 96 shown in FIG. 1 may be executed by the control circuit 40 in the printer 20. In this modified structure, the control circuit 40 of the printer 20 exerts part or all of the functions of the computer 90 as the print control device that generates print data.

When part or all of the functions of the invention are attained by the software configuration, the software (computer programs) may be stored in computer-readable recording media. The 'computer-readable recording media' of the invention include portable recording media like flexible disks and CD-ROMs, as well as internal storage devices of the computer, such as various RAMs and ROMs, and external storage devices fixed to the computer, such as hard disks.

The patent applications given below as the bases of the priority claim of the present application are included in the disclosure hereof by reference:

(1) Patent Application No. 2003-193266 (filed on Jul. 8, 2003)

(2) Patent Application No. 2003-193270 (filed on Jul. 8, 2003)

What is claimed is:

1. A printing control method of generating print data to be supplied to a print unit to print, the print unit forming dots on a print medium by ejecting ink droplets of at least one type of colored ink containing a color material and a quality-enhancing ink for enhancing quality of a printed material, the printing control method comprising:

(a) selecting a color dot recording rate table storing a color dot recording rate representing a dot recording rate of a color dot formed with the colored ink for specifying the color dot recording rate, while selecting a transparent dot recording rate table storing a transparent dot recording rate representing a dot recording rate of a transparent dot formed with the quality-enhancing ink for specifying the transparent dot recording rate; and (b) generating dot data representing a state of dot formation of the color dot and the transparent dot at each pixel according to a pixel value of given image data based on the selected dot recording rate table;

wherein the transparent dot recording rate table is configured to require a less process load for generation of the dot data than the color dot recording rate table.

2. The print control method in accordance with claim 1, wherein the printing unit comprises a print head having a plurality of nozzles and a plurality of ejection drive elements for ejecting ink drops from the plurality of nozzles, and is capable of selectively forming one of N types of dots having different sizes at one pixel area with each nozzle, the N being an integer of at least 2; and the transparent dot recording rate table is configured to have a greater maximum dot recording rate of a specific dot than a maximum dot recording rate of the specific dot in the color dot recording rate table, the specific dot being at least one type of dot among the N types of dots.

3. The print control method in accordance with claim 2, wherein the step (b) comprises:

a color conversion step of converting a pixel value of the given image data representing color of each pixel into tone values of respective inks to express the color of the pixel with at least part of the color inks and the quality-enhancing ink available in the printing module; and a tone-decreasing step of generating the dot data according to the tone values of the respective inks obtained in the color conversion step, wherein the tone-decreasing step determines the transparent dot recording rate according to the tone value of the quality-enhancing ink based on the selected transparent dot recording rate table, while determines the color dot recording rate according to the tone value of the color ink based on the selected color dot recording rate table, and the transparent dot recording rate table is configured to require the reduced process load due to a greater ratio of a number of tones expressed by only the specific dot to a total number of tones than the ratio of the color dot recording rate table.

4. The print control method in accordance with claim 2, wherein the specific dot is a smallest-size dot among the N types of dots.

5. The print control method in accordance with claim 2, wherein the step (b) comprises:

a color conversion step of converting a pixel value of the given image data representing color of each pixel into tone values of respective inks to express the color of the pixel with at least part of the color inks and the quality-enhancing ink available in the printing module; and a tone-decreasing step of generating the dot data according to the tone values of the respective inks obtained in the color conversion step, wherein the tone-decreasing step determines no formation of at least one type of dot among the N types of dots when the tone value of the quality-enhancing ink is within a predetermined range, and determines a dot on-off state to express the tone value of the quality-enhancing ink with the other types of dots including the specific dot.

6. The print control method in accordance with claim 1, wherein the printing unit comprises a print head having a plurality of nozzles and a plurality of ejection drive elements for ejecting ink drops from the plurality of nozzles, and is capable of selectively forming one of N types of dots having different sizes at one pixel area with each nozzle, the N being an integer of at least 2; and the transparent dot recording rate table is configured to have a greater ratio of colors requiring formation of only a specific dot to all colors expressed by the pixel values of the given image data than the ratio in the color dot recording rate table, whereby reducing the process load, the specific dot being at least one type of dot among the N types of dots.

7. The print control method in accordance with claim 6, wherein the step (b) comprises:

a color conversion step of converting a pixel value of the given image data representing color of each pixel into tone values of respective inks to express the color of the pixel with at least part of the color inks and the quality-enhancing ink available in the printing module; and a tone-decreasing step of generating the dot data according to the tone values of the respective inks obtained in the color conversion step, wherein the tone-decreasing step determines the transparent dot recording rate according to the tone value of the quality-enhancing ink based on the selected transparent dot recording rate table, while determines the color dot recording rate according to the tone value of the color ink based on the selected color dot recording rate table, and the transparent dot recording rate table is configured to require the reduced process load due to having a greater ratio of a number of tones expressed by only the specific dot to a total number of tones than the ratio of the color dot recording rate table.

8. The print control method in accordance with claim 6, wherein the specific dot is a smallest-size dot among the N types of dots.

9. The print control method in accordance with claim 6, wherein the step (b) comprises:

a color conversion step of converting a pixel value of the given image data representing color of each pixel into tone values of respective inks to express the color of the pixel with at least part of the color inks and the quality-enhancing ink available in the printing module; and a tone-decreasing step of generating the dot data according to the tone values of the respective inks obtained in the color conversion step, wherein the tone-decreasing step determines no formation of at least one type of dot among the N types of dots when the tone value of the quality-enhancing ink is within a predetermined range, and determines a dot on-off state to express the tone value of the quality-enhancing ink with the other types of dots including the specific dot.

10. The print control method in accordance with claim 1, wherein the printing unit comprises a print head having a plurality of nozzles and a plurality of ejection drive elements for ejecting ink drops from the plurality of nozzles, and is capable of selectively forming one of N types of dots having different sizes at one pixel area with each nozzle, the N being an integer of at least 2; and the transparent dot recording rate table is configured to require the reduced process load due to fixing a dot recording rate of a specific dot to zero against all available pixel values, the specific dot being at least one type of dot among the N types of dots.

11. The print control method in accordance with claim 10, wherein the step (b) comprises:

a color conversion step of converting a pixel value of the given image data representing color of each pixel into tone values of respective inks to express the color of the pixel with at least part of the color inks and the quality-enhancing ink available in the printing module; and a tone-decreasing step of generating the dot data according to the tone values of the respective inks obtained in the color conversion step, wherein the tone-decreasing step determines no formation of the specific dot among the N types of dots without exception and specifies a dot on-off state of other types of dots but the specific dot among the N types of dots according to the tone value of the quality-enhancing ink.

12. The print control method in accordance with claim 10, wherein the transparent dot recording rate table is configured to require the reduced process load due to having a less number of tones stored corresponding to the transparent dot recording rate than a number of tones stored corresponding to the color dot recording rate in the color dot recording rate table.

13. The print control method in accordance with claim 10, wherein the transparent dot recording rate table includes multiple tables provided corresponding to different types of the printing medium, and the step (a) includes the step of selecting one of the multiple tables according to type of the printing medium.

14. The print control method in accordance with claim 10, wherein the transparent dot recording rate table includes multiple tables provided corresponding to different types of the quality-enhancing ink, and the step (a) includes the step of selecting one of the multiple tables according to type of the quality-enhancing ink.

15. A printing method of forming dots on a print medium by ejecting ink drops of at least one type of colored ink containing a color material and a quality-enhancing ink for enhancing quality of a printed material, the printing method comprising the steps of:

(a) selecting a color dot recording rate table storing a color dot recording rate representing a dot recording rate of a color dot formed with the colored ink for specifying the color dot recording rate, while selecting a transparent dot recording rate table storing a transparent dot recording rate representing a dot recording rate of a transparent dot formed with the quality-enhancing ink for specifying the transparent dot recording rate;

(b) generating dot data representing a state of dot formation of the color dot and the transparent dot at each pixel according to a pixel value of given image data based on the selected dot recording rate table; and (c) forming dots on the print medium by ejecting ink drops of the colored ink and the quality-enhancing ink;

wherein the transparent dot recording rate table is configured to require a less process load for generation of the dot data than the color dot recording rate table.

16. A printing apparatus for printing by forming dots on a printing medium, the printing apparatus comprising:

a print unit configured to form the dots on a print medium by ejecting ink droplets of at least one type of colored ink containing a color material and a quality-enhancing ink for enhancing quality of a printed material; and a dot data generator configured to select a color dot recording rate table storing a color dot recording rate representing a dot recording rate of a color dot formed with the colored ink for specifying the color dot recording rate, select a transparent dot recording rate table storing a transparent dot recording rate representing a dot recording rate of a transparent dot formed with the quality-enhancing ink for specifying the transparent dot recording rate and generate dot data representing a state of dot formation of the color dot and the transparent dot at each pixel according to a pixel value of given image data based on the selected dot recording rate table;

wherein the transparent dot recording rate table is configured to require a less process load for generation of the dot data than the color dot recording rate table.

17. A printing control apparatus for generating print data to be supplied to a print unit to print, the print unit forming dots on a print medium by ejecting ink droplets of at least one type of colored ink containing a color material and a quality-enhancing ink for enhancing quality of a printed material, the printing control apparatus comprising:

a dot data generator configured to select a color dot recording rate table storing a color dot recording rate representing a dot recording rate of a color dot formed with the colored ink for specifying the color dot recording rate, select a transparent dot recording rate table storing a transparent dot recording rate representing a dot recording rate of a transparent dot formed with the quality-enhancing ink for specifying the transparent dot recording rate and generate dot data representing a state of dot formation of the color dot and the transparent dot at each pixel according to a pixel value of given image data based on the selected dot recording rate table;

wherein the transparent dot recording rate table is configured to require a less process load for generation of the dot data than the color dot recording rate table.

18. A computer program product for causing a computer to generate print data to be supplied to a print unit to print, the print unit forming dots on a print medium by ejecting ink droplets of at least one type of colored ink containing a color material and a quality-enhancing ink for enhancing quality of a printed material, the computer program product comprising:

a computer readable medium; and a computer program stored on the computer readable medium, the computer program comprising:

a first program for causing the computer to select a color dot recording rate table storing a color dot recording rate representing a dot recording rate of a color dot formed with the colored ink for specifying the color dot recording rate, and select a transparent dot recording rate table storing a transparent dot recording rate representing a dot recording rate of a transparent dot formed with the quality-enhancing ink for specifying the transparent dot recording rate; and a second program for causing the computer to generate dot data representing a state of dot formation of the color dot and the transparent dot at each pixel according to a pixel value of given image data based on the selected dot recording rate table;

wherein the transparent dot recording rate table is configured to require a less process load for generation of the dot data than the color dot recording rate table.

* * * * *